(12) United States Patent
Takemoto et al.

(10) Patent No.: US 7,198,656 B2
(45) Date of Patent: Apr. 3, 2007

(54) VACUUM CLEANER

(75) Inventors: Ritsuo Takemoto, Kanagawa (JP);
Masatoshi Tanaka, Kanagawa (JP);
Hiroshi Yokoyama, Kanagawa (JP);
Hitoshi Suzuki, Kanagawa (JP);
Kiyoshi Ebe, Kanagawa (JP);
Yoshihiro Tsuchiya, Shizuoka (JP); **Ai
Tanaka, Kanagawa (JP); Yasushi
Nakatogawa, Kanagawa (JP); Ikuo
Oshima, Kanagawa (JP); Yusuke
Kinoshita, Kanagawa (JP); Yutaka
Maeda**, Kanagawa (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 11/091,920

(22) Filed: Mar. 28, 2005

(65) Prior Publication Data

US 2005/0166560 A1 Aug. 4, 2005

Related U.S. Application Data

(63) Continuation of application No. PCT/JP03/03365, filed on Mar. 19, 2003.

(30) Foreign Application Priority Data

Oct. 31, 2002 (JP) ............................. 2002-317919
Nov. 29, 2002 (JP) ............................. 2002-348564
Jan. 17, 2003 (JP) ............................. 2003-009103

(51) Int. Cl.
*B01D 45/12* (2006.01)

(52) U.S. Cl. ............................. 55/337; 55/429; 55/349; 55/459.1; 55/481; 55/503; 55/DIG. 3; 15/347; 15/352; 15/353; 96/416

(58) Field of Classification Search ................ 15/347, 15/352, 353; 55/337, 429, DIG. 3, 349, 55/459.1, 481, 503; 96/416
See application file for complete search history.

(56) References Cited

U.S. PATENT DOCUMENTS 5,135,552 A * 8/1992 Weistra ...................... 55/337

(Continued)

FOREIGN PATENT DOCUMENTS

DE 2343971 * 4/1974 .................. 55/337

(Continued)

OTHER PUBLICATIONS

Communication from foreign Patent Office (with translation) regarding counterpart application.

(Continued)

*Primary Examiner*—Minh-Chau T. Pham
(74) *Attorney, Agent, or Firm*—Harness, Dickey & Pierce, P.L.C.

(57) ABSTRACT

There is disclosed a vacuum cleaner including a dust separation section which separates air and dust flowing toward an intake port of a motor blower through a connection port of a cleaner main body. The dust separation section includes an air path forming member which performs a separation function. The forming member includes an introductory port, a derivative port, and an opening disposed between these. In the separation function, while dust-containing air flows toward the derivative port from the introductory port, a part of the air is sucked by the motor blower through the opening. Accordingly, the air is separated from the dust which goes straight in the air path forming member with inertia.

15 Claims, 15 Drawing Sheets

U.S. PATENT DOCUMENTS

| | | | |
|---|---|---|---|
| 6,406,505 B1* | 6/2002 | Oh et al. | 55/337 |
| 6,484,350 B2* | 11/2002 | Yung | 15/327.1 |
| 6,840,972 B1* | 1/2005 | Kim | 55/337 |
| 6,889,403 B2* | 5/2005 | Inoue et al. | 15/353 |
| 6,896,719 B2* | 5/2005 | Coates et al. | 95/268 |
| 6,902,596 B2* | 6/2005 | Conrad et al. | 55/459.1 |
| 6,913,635 B2* | 7/2005 | Yoo et al. | 55/476 |
| 6,977,003 B2* | 12/2005 | Lim et al. | 55/337 |
| 2006/0000195 A1* | 1/2006 | Lim et al. | 55/337 |

FOREIGN PATENT DOCUMENTS

| | | |
|---|---|---|
| JP | 43-10789 | 5/1968 |
| JP | 43-22627 | 9/1968 |
| JP | 47-9805 | 4/1972 |
| JP | 51-54465 | 10/1974 |
| JP | 51-146858 | 5/1975 |
| JP | 52-99651 | 8/1977 |
| JP | 54-12152 | 1/1979 |
| JP | 54-071864 | 6/1979 |
| JP | 54-71864 | 6/1979 |
| JP | 54-161751 | 12/1979 |
| JP | 55-38132 | 3/1980 |
| JP | 55-155623 | 12/1980 |
| JP | 61-22563 | 6/1986 |
| JP | 62-66755 | 4/1987 |
| JP | 64-76817 | 3/1989 |
| JP | 64-076817 | 3/1989 |
| JP | 6-41815 | 6/1994 |
| JP | 06-209882 | 8/1994 |
| JP | 6-209882 | 8/1994 |
| JP | 2001-104223 | 4/2001 |
| JP | 2002-143052 | 5/2002 |
| JP | 2002-306380 | 10/2002 |
| WO | WO 2004/028327 | 3/2003 |

OTHER PUBLICATIONS

International Search Report for PCT/JP03/03365 dated Jun. 24, 2003.

* cited by examiner

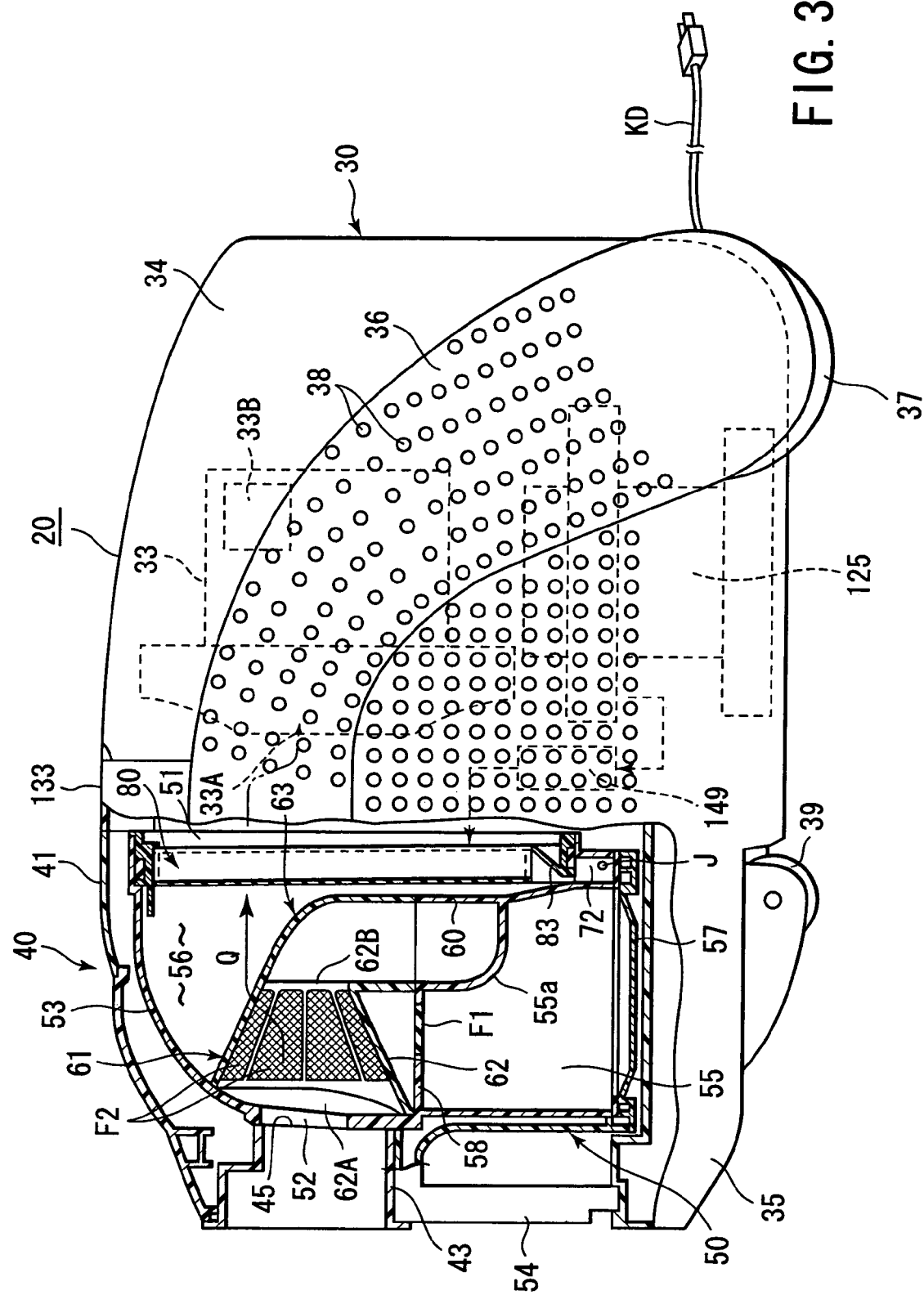

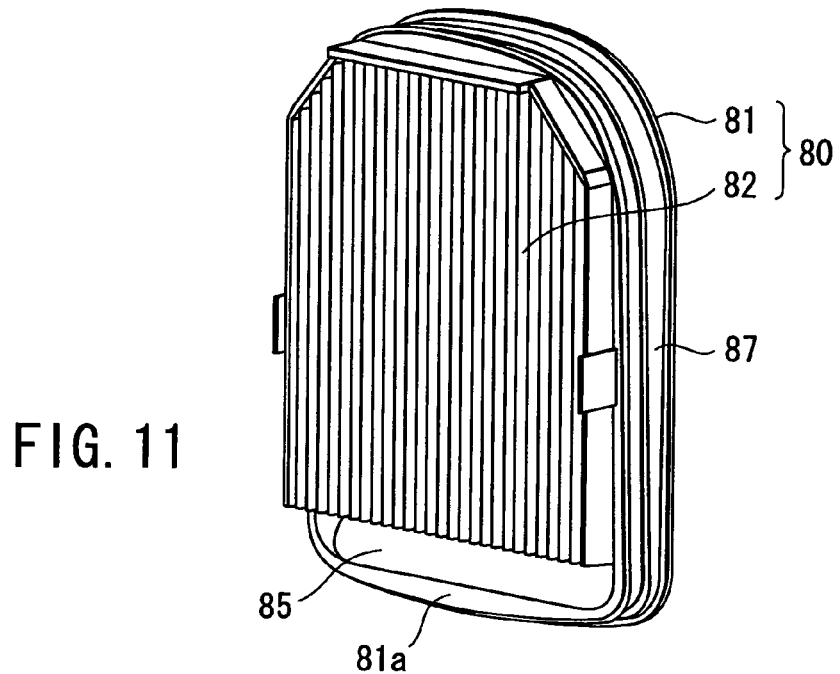
FIG. 11
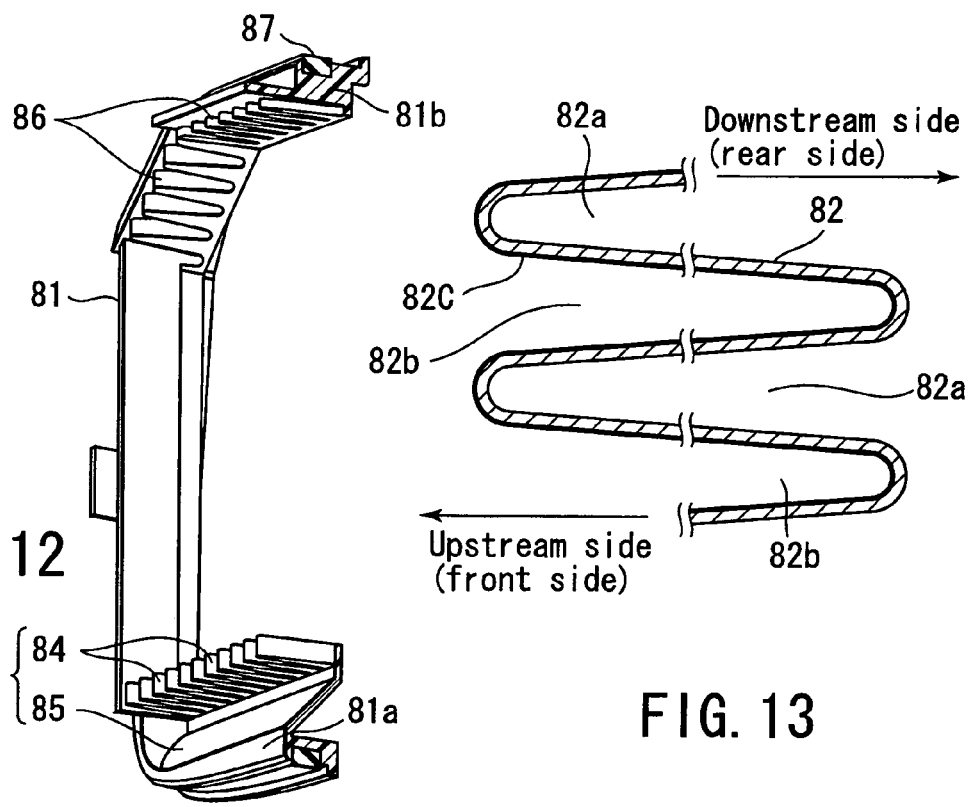
FIG. 12
FIG. 13

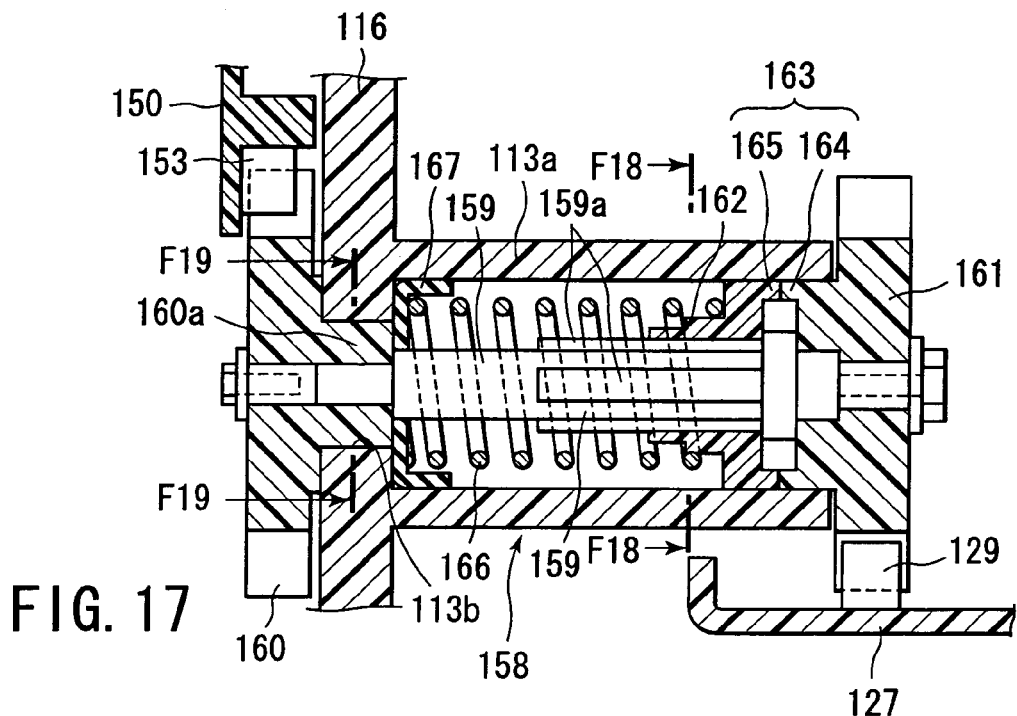
FIG. 17
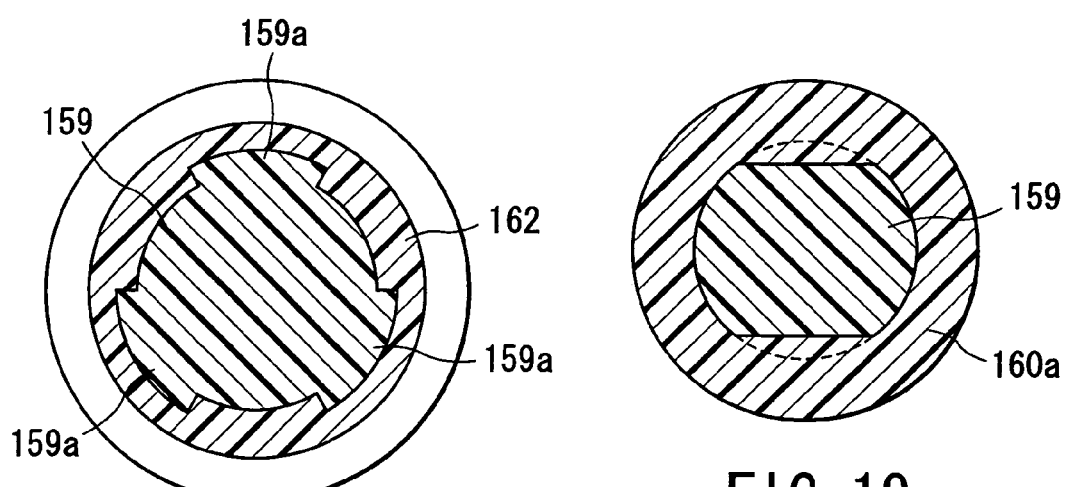
FIG. 18
FIG. 19

VACUUM CLEANER

CROSS REFERENCE TO RELATED APPLICATIONS

This is a Continuation Application of PCT Application No. PCT/JP03/03365, filed Mar. 19, 2003, which was published under PCT Article 21(2) in Japanese.

This application is based upon and claims the benefit of priority from prior Japanese Patent Applications No. 2002-317919, filed Oct. 31, 2002; No. 2002-348564, filed Nov. 29, 2002; and No. 2003-009103, filed Jan. 17, 2003, the entire contents of all of which are incorporated herein by reference.

BACKGROUND OF THE INVENTION

1. Field of the Invention

The present invention relates to a vacuum cleaner including a first dust separation section for separating dust in sucked dust-containing air, and a second dust separation section disposed on a downstream side of the first dust separation section, particularly to a vacuum cleaner in which the first dust separation section uses inertia of the dust to separate the dust.

2. Description of the Related Art

A cyclone vacuum cleaner which separates air from dust by centrifugal separation in a first dust separation section and by filter separation in a second separation section is known; see Jpn. Pat. Appln. KOKAI Publication No. 2001-104223.

This vacuum cleaner includes a dust cup whose upper part is opened, and a motor blower which brings the inside of this cup into a negative pressure. A filter is disposed in an upper opening of the dust cup. An intake port is connected to a peripheral wall of the dust cup. The intake port is connected to a draw-in port member which draws in the dust via an intake passage.

Dust-containing air drawn into the dust cup turns in this cup with operation of the motor blower. By this turning, heavy dust particles are separated from the air. The separated dust accumulates in the dust cup, and the air is sucked into the motor blower through a filter.

The dust which has accumulated in the dust cup soars every time the operation of the motor blower is restarted. The filter is directly engaged in the dust cup, and therefore the dust which has soared is attached to or entwined with the filter. Therefore, the filter is clogged at an early stage, thus the function of separation of the air and dust easily drops.

The cyclone vacuum cleaner which separates the air from the dust by the centrifugal separation in the first dust separation section and by the filter separation in the second separation section is also known; see Jpn. Utility Model Appln. No. 60-157686.

In this vacuum cleaner, the inside of a cylindrical dust collector body is divided into upper and lower dust collector chambers. A horizontal partition plate which assumes this division includes an exhaust cylinder which communicates with both the dust collector chambers in a middle part. A suction port in a tangent line direction is disposed in the lower dust collector chamber. The suction port and lower dust collector chamber form the cyclone type of first dust separation section. A filter is disposed in the upper dust collector chamber to cover a draw-in side of an exhaust fan. The filter and upper dust collector chamber form the second dust separation section.

When the exhaust fan is operated, the first dust separation section carries out the cyclone type of dust separation. At this time, the air is drawn in the exhaust fan through the filter of the upper dust collector chamber.

The dust which has accumulated in the upper and lower dust collector chambers soars every time the operation of the motor blower is restarted. The dust which has soared is sometimes attached to or entwined with the filter. Therefore, the filter is clogged at the early stage, and the function of the separation of the air and dust easily drops.

The vacuum cleaner using a pleated exhaust fan for filtering and separating the dust from the air is known from Jpn. Pat. Appln. KOKAI Publication No. 2002-306380.

A dividing section, which is a quadrangular frame, surrounds the exhaust filter. The exhaust filter has pleads that extend in vertical direction. The dust that sticks to the surface of the exhaust filter while the motor blower is operating can therefore easily come off and falls. The lower frame part of the dividing section receives and holds the dust falling from the exhaust filter. This decreases the area of effective filter region, inevitably reducing the capability of the exhaust filter. If the second dust separation section employs the pleated filter, its efficiency of separating dust from air will decrease.

The vacuum cleaner which separates the air from the dust by inertia separation in the first dust separation section and by filter separation with the pleated filter in the second separation section is known, from Jpn. Pat. KOKOKU Publication No. 61-22563.

The vacuum cleaner includes a partition wall including an opening for exposing a front part of a pleated main filter. This partition wall contacts a side periphery of a filter hold member. A bottom plate is integrally disposed in the partition wall, and is disposed opposite to the main filter from below. A primary filter disposed integrally with the bottom plate is disposed in an outer periphery of the partition wall. The primary filter includes a mesh section and an impermeable wall disposed opposite to a hose port. The hose port opposed wall is formed so as to divert an air current leading to the front part of the main filter from a coarse dust chamber in a dust collector case. A hose connection port of the dust collector case is disposed opposite to the hose port opposed wall.

In this constitution, the dust-containing air which has entered the dust collector case from the hose connection port collides with the hose port opposed wall. Therefore, the coarse dust in the air falls into the coarse dust chamber. On the other hand, the air flowing along the surface of the hose port opposed wall passes through the mesh section and inverts a flow direction. After flowing along a back surface of the hose port opposed wall, the air flows through the main filter.

In the technique for allowing the dust-containing air to collide with the hose port opposed wall to separate the air from the dust, a technique of using an inertial force of the dust in the air current to separate the dust is not taught. With the collision of the dust-containing air with the hose port opposed wall, turbulence is generated, and therefore windage is large. Additionally, since the air current goes by the hose opposed wall, the windage is large. Because of this, the function of the separation of the air and dust easily drops on an upstream side of the main filter.

An object of the present invention is to provide a vacuum cleaner in which a capability of the separation of air and dust can be inhibited from dropping and a cleaning capability can be improved.

BRIEF SUMMARY OF THE INVENTION

A preferable aspect of the present invention includes a first dust separation section, a first dust accumulation section, and a second dust separation section. The first dust separation section is disposed between a connection port of a cleaner main body and an intake port of a motor blower built in the cleaner main body.

Dust separated by the first dust separation section is accumulated in the first dust accumulation section. A second dust separation section is disposed between the first dust separation section and the motor blower. This second dust separation section includes a mat filter element which filters the dust from air drawn into the intake port.

The first dust separation section includes an air path forming member which separates the air from the dust flowing toward the intake port through the connection port. An axial line of the air path forming member is linear. The air path forming member includes an introductory port, a derivative port, and an opening. Dust-containing air passed through the connection port is introduced into the introductory port. The separated dust is derived via the derivative port. The opening is disposed between the introductory port and derivative port. Via this opening, a part of the air flowing toward the derivative port from the introductory port can be sucked into the intake port of the motor blower. By this suction, the air is separated from the dust which goes straight toward the derivative port from the introductory port with inertia.

In this preferable aspect, the air and dust drawn into the connection port by the operation of the motor blower are separated by the first dust separation section. The separated heavy dust is accumulated in the first dust accumulation section, and is inhibited from sticking to the filter element of the second dust separation section.

In the function of the separation of the air and dust in the first dust separation section, the drawn dust-containing air is allowed to flow toward the derivative port from the introductory port, while a part of the flowing air is sucked into the motor blower through the opening of the air path forming member. Accordingly, the air is separated from the dust which goes straight in the air path forming member with the inertia.

Swirl is inhibited from being caused in the separation. Additionally, since the flow of the dust-containing air does not invert or detour, windage is small. Therefore, since a capability of separation of the air and dust is inhibited from dropping, a cleaning capability can be improved.

A preferable aspect of the present invention includes a first dust separation section, a first dust accumulation section, a second dust separation section, a partition wall, and a second dust accumulation section. The first dust separation section is disposed between a connection port of a cleaner main body and an intake port of a motor blower built in the cleaner main body.

The dust separated by the first dust separation section is accumulated in the first dust accumulation section. The second dust separation section is disposed between the first dust separation section and motor blower. This second dust separation section includes a mat filter element which filters the dust from air drawn into the intake port. This filter element is used in upright position.

The partition wall is disposed to partition a negative-pressure space in which the first dust separation section is contained from the first dust accumulation section. A gap is formed between the partition wall and a lower surface of the filter element. The gap is narrow than the negative-pressure space, and communicates with the negative-pressure space. The second dust accumulation section communicates with the gap and is disposed below the second dust separation section. In the second dust accumulation section, the dust falling from the filter element is accumulated separately from the first dust accumulation section.

The first dust separation section includes an air path forming member which separates the air from the dust which flows toward the intake port through the connection port. An axial line of the air path forming member is linear. The air path forming member includes an introductory port, a derivative port, and an opening. Dust-containing air passed through the connection port is introduced into the introductory port. The separated dust is derived via the derivative port. The opening is disposed between the introductory port and derivative port. Via this opening, a part of the air flowing toward the derivative port from the introductory port can be sucked into the intake port of the motor blower. By this suction, the air is separated from the dust which goes straight toward the derivative port from the introductory port with inertia.

In this preferable aspect, the air and dust drawn into the connection port by the operation of the motor blower are separated by the first dust separation section. The separated heavy dust is accumulated in the first dust accumulation section, and is inhibited from sticking to the filter element of the second dust separation section.

In the function of the separation of the air and dust in the first dust separation section, the drawn dust-containing air is allowed to flow toward the derivative port from the introductory port, while a part of the flowing air is sucked into the motor blower through the opening of the air path forming member. Accordingly, the air is separated from the dust which goes straight in the air path forming member with the inertia.

The swirl is inhibited from being caused in the separation. Additionally, since the flow of the dust-containing air does not invert or detour, windage is small. Therefore, since the capability of the separation of the air and dust is inhibited from dropping, the cleaning capability can be improved.

When the operation of the motor blower is stopped, the dust sticking to the filter element of the second dust separation section falls with its own weight, and is accumulated in the second dust accumulation section. Immediately after the operation of the motor blower is restarted, the air in the negative-pressure space is disturbed. However, this disturbance is inhibited from spreading into the second dust accumulation section by the narrow gap. Accordingly, the dust accumulated in the second dust accumulation section can be inhibited from soaring and again sticking to the filter element.

BRIEF DESCRIPTION OF THE SEVERAL VIEWS OF THE DRAWING

FIG. 3 is a partially sectional side view of the cleaner main body of FIG. 2;

FIG. 11 is a perspective view showing the second dust separation section disposed in the dust cup of FIG. 5;

FIG. 12 is a perspective view showing a part of a filter frame disposed in the second dust separation section of FIG. 11;

FIG. 13 is a partially enlarged sectional view of a filter element disposed in the second dust separation section of FIG. 11;

FIG. 17 is a sectional view showing a rotary force transmission mechanism of the dust drop device of FIG. 14;

FIG. 18 is a sectional view taken along line F18—F18 in FIG. 17;

FIG. 19 is a sectional view taken along line F19—F19 in FIG. 17;

DETAILED DESCRIPTION OF THE INVENTION

A first embodiment of the present invention will be described hereinafter with reference to FIGS. 1 to 19.

Figure 1:
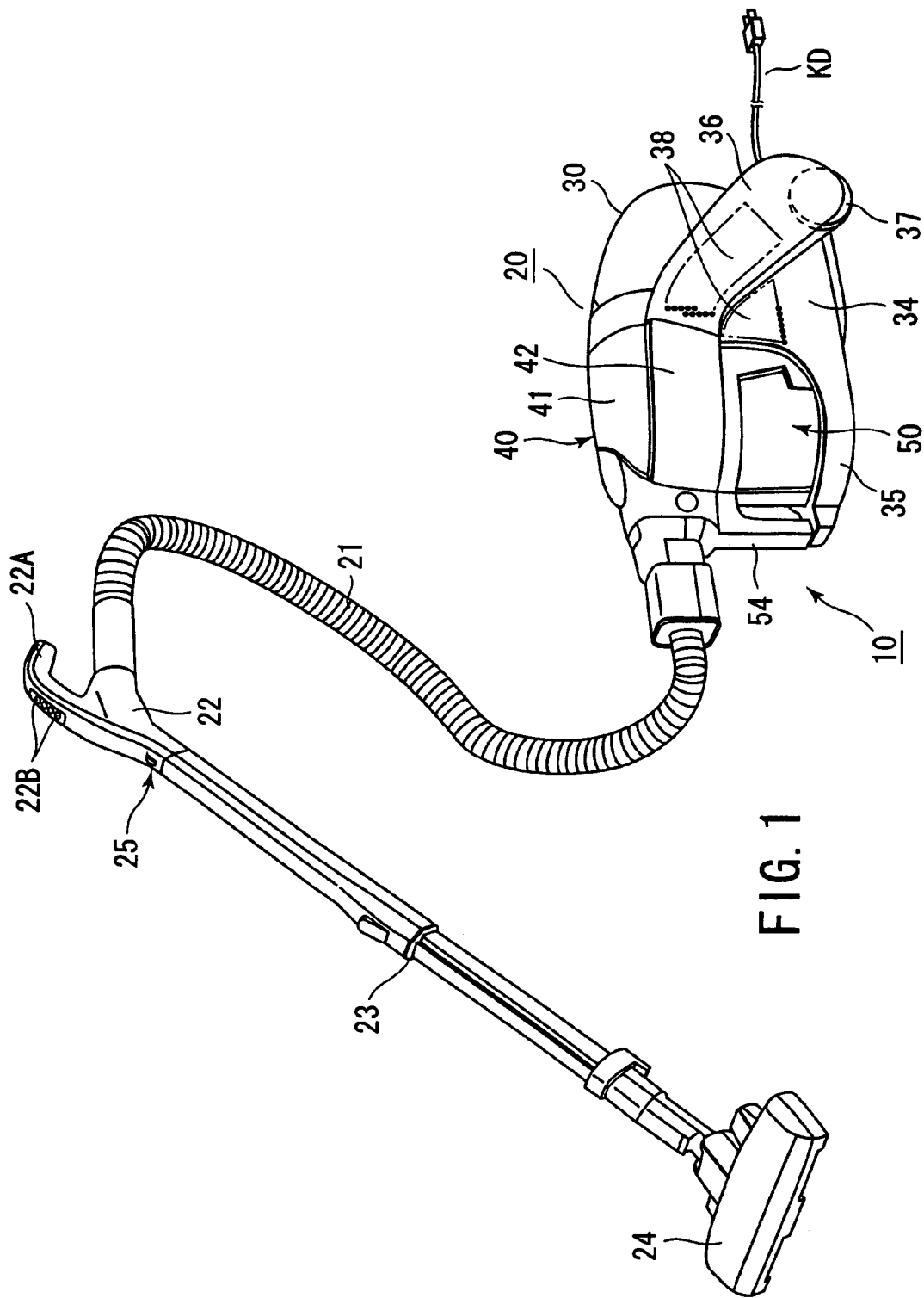
FIG. 1 is a perspective view showing a vacuum cleaner according to a first embodiment of the present invention.

In FIG. 1, a vacuum cleaner shown by a reference numeral 10 includes a cleaner main body 20. This main body 20 is removably connected to one end of a flexible dust suction hose 21. The other end of the dust suction hose 21 includes a handling operation section 22. The handling operation section 22 includes a handle 22A. This handle 22A includes operation switches 22B for remote operation.

The handling operation section 22 is connected to an expandable/contractible extension pipe 23 so that the tube is attachable/detachable. A tip end of the extension pipe 23 is connected to an attachable/detachable draw-in port member 24. The dust suction hose 21, extension pipe 23, and draw-in port member 24 form an intake passage member 25.

As shown in FIGS. 1 to 4, the cleaner main body 20 includes a main-body case 30, a dust cup 50, and a lid member 40. The dust cup 50 is disposed in the main-body case 30 so as to be attachable/detachable. The lid member 40 is attached to a front part of the main-body case 30 by a hinge (not shown), and the lid member 40 is rotatable in a vertical direction.

The main-body case 30 includes a case main section 34 and a cup receiver section 35. As shown in FIG. 3, a motor blower 33 is built in the case main section 34. The motor blower 33 includes an intake port 33A opened forwards. The motor blower 33 is disposed in such a manner that a most part of the intake port 33A is disposed in the vicinity of an upper part of the case main section 34.

The cup receiver section 35 projects forwards integrally from the lower part of the case main section 34. The receiver section 35 is formed in a concave shape opening upwards. The dust cup 50 is laid on the cup receiver section 35 so as to be attachable/detachable. The dust cup 50 is vertically held between the closed lid member 40 and cup receiver section 35, and is attached to the cleaner main body 20.

Swollen sections 36 (only one is shown) are integrally formed on opposite side walls in a width direction of the case main section 34. These swollen sections 36 are obliquely disposed over a lower part in the vicinity of a rear part from an upper part in the vicinity of a front part of the case main section 34.

Exhaust sections 38 including a plurality of exhaust holes are disposed in a part in the vicinity of the front part of the opposite swollen sections 36 and the opposite side walls of the case main section 34. These exhaust sections 38 communicate with an exhaust port 33B (see FIG. 3) of the motor blower 33 via an exhaust air path (not shown). The air exhausted from the exhaust port 33B is exhausted to the outside from the exhaust sections 38 via the exhaust air path.

Rear wheels 37 are rotatably attached to lower ends of the opposite swollen sections 36. A front wheel 39 including a castor is attached to the underside of the cup receiver section 35. The cleaner main body 20 can move on a plane to be cleaned such as a floor of a house by the front wheel 39 and rear wheels 37.

The case main section 34 incorporates a cord reel 125 and dust drop device 149 described later. The cord reel 125 is provided below the motor blower 33. This cord reel 125 supplies power of a commercial alternating current power source to the motor blower 33, and the like.

The dust drop device 149 is operated using rotation of the cord reel 125 in extracting/inserting a power cord as a driving force. This dust drop device 149 applies vibration for dropping off the dust to a filter element 82 described later.

The dust drop device 149 can be omitted. Instead of the cord reel 125, a battery for supplying the power to the motor blower 33, and the like may also be built in. The dust drop device may also be disposed in a constitution in which the battery is built in. In this case, a dust drop operation section may be disposed outside the main-body case 30 so as to operate the dust drop device by the operation of the operation section.

The lid member 40 includes a top plate 41 and peripheral wall 42. The top plate 41 is formed substantially in an elliptic shape in a plan view. The peripheral wall 42 is formed integrally around the top plate 41. The front part of the peripheral wall 42 includes a connection port 43 which is to be connected to the dust suction hose 21 so as to be attachable/detachable. This connection port 43 forms a pipe shape extending in a forward/backward direction in a state in which the lid member 40 is closed. Opposite ends of the connection port 43 in an axial direction are opened, respectively. In the state in which the lid member 40 is closed, a rear-end opening 45 of the connection port 43 is disposed so as to directly continue with a first dust separation section 61 described later from the front side (upstream).

As shown in FIGS. 5 to 9, the dust cup 50 includes a container case member 53, a handle section 54 disposed in the container case member 53, and an openable/closable bottom plate 57. A rear part of the container case member 53 is substantially entirely opened. An air hole 52 is disposed in a front wall 50a of the container case member 53 disposed opposite to this opening 51 (shown in FIGS. 7 and 8). The handle section 54 is positioned below the air hole 52 and disposed in the front wall 50a.

The container case member 53 includes a first dust accumulation section 55, a space (hereinafter referred to as the negative-pressure space) 56 which is brought into a negative pressure by the operation of the motor blower 33, and the first dust separation section 61.

The first dust accumulation section 55 is disposed in the lower part of the container case member 53. The negative-pressure space 56 is disposed above the first dust accumulation section 55. The negative-pressure space 56 functions as an air path leading to a filter 80 which is a second dust separation section described later from openings 64 described later of the first dust separation section 61. Furthermore, the negative-pressure space 56 also functions as the air path leading to the filter 80 from an air hole 59 described later.

The first dust accumulation section 55 and negative-pressure space 56 are arranged one above the other in the cleaner main body 20. An arrangement direction of the dust accumulation section 55 and negative-pressure space 56 may be any of a left/right (width) direction, forward/backward (axis) direction, and oblique direction of the cleaner main body 20.

The bottom surface of the first dust accumulation section 55 is opened. The bottom plate 57 is attached to a bottom part of the first dust accumulation section 55 so as to be openable/closable around an axis J. When this bottom plate 57 is opened, the dust accumulated in the first dust accumulation section 55 can be discarded. A closed state of the bottom plate 57 is released via a mechanism (not shown) which links with a pushed-in operation button disposed in the handle section 54.

The first dust accumulation section 55 and negative-pressure space 56 are defined by an uprising wall 60 and ceiling wall 58 which continue with each other. These uprising wall 60 and ceiling wall 58 function as partition walls. The uprising wall 60 is provided on the lower part of the container case member 53 and near the opening 51. The ceiling wall 58 bends from an upper end of the uprising wall 60 and continues with the front wall 50a. Therefore, the first dust accumulation section 55 is defined by a lower peripheral wall and the partition walls of the container case member 53. The negative-pressure space 56 is defined by an upper peripheral wall and the partition walls of the container case member 53.

Figure 5:
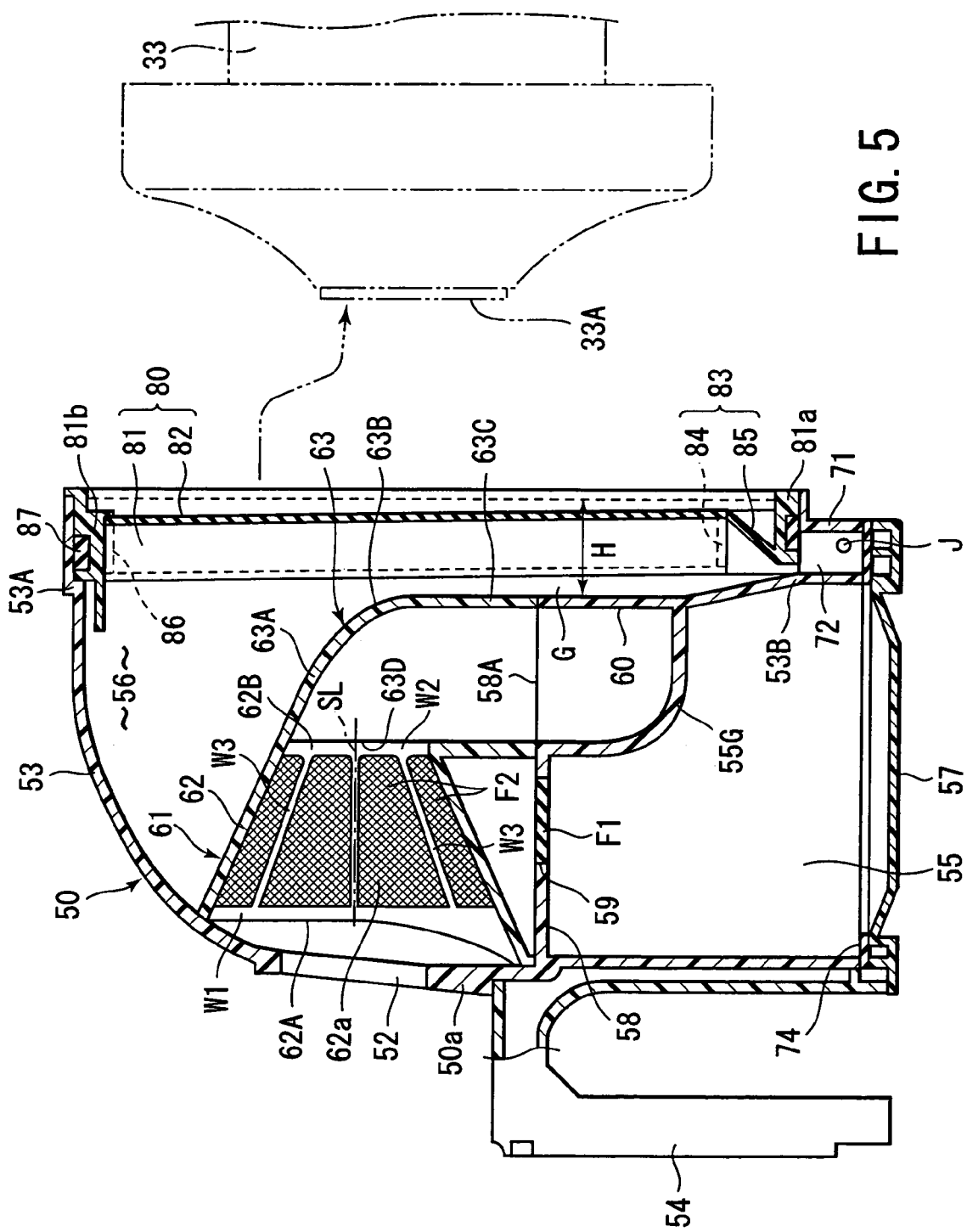
FIG. 5 is a longitudinal sectional view showing a dust cup of the vacuum cleaner of FIG. 1.
Figure 6:
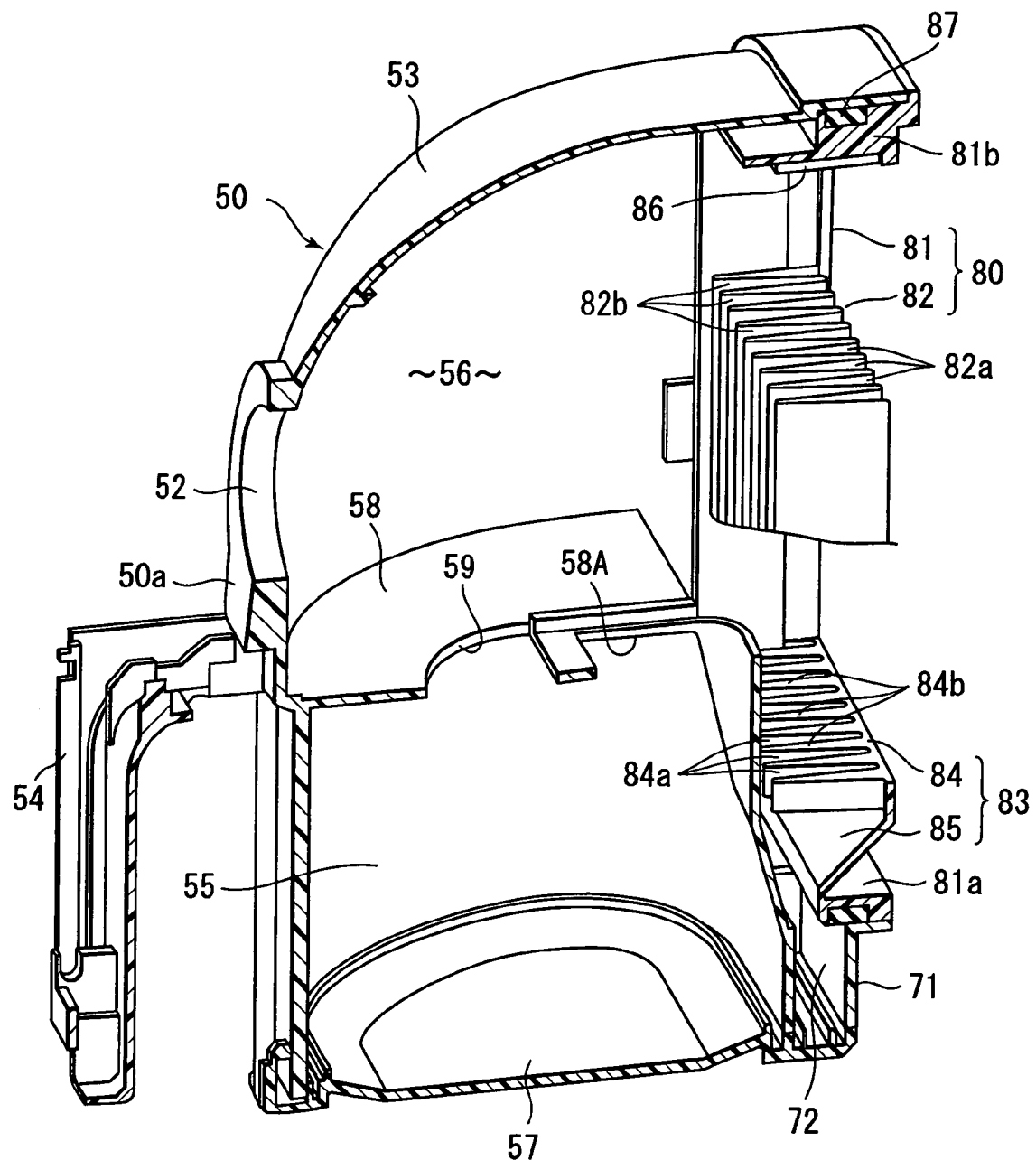
FIG. 6 is a partially cut perspective view of the dust cup of FIG. 5.
Figure 8:
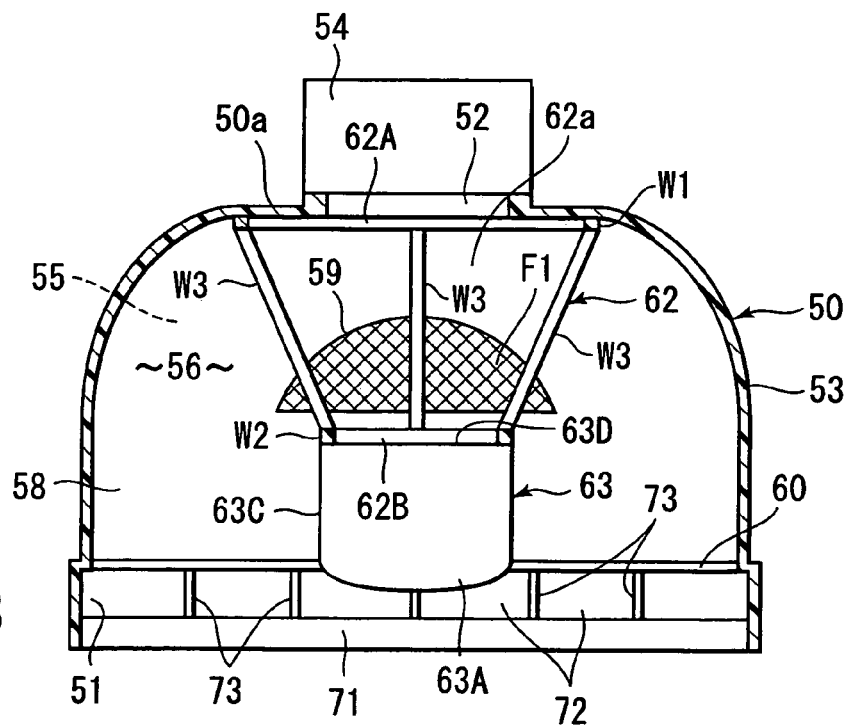
FIG. 8 is a lateral sectional plan view showing the dust cup of FIG. 5 in the state in which the second dust separation section is removed and additionally the filter of the first dust separation section is removed.
Figure 9:
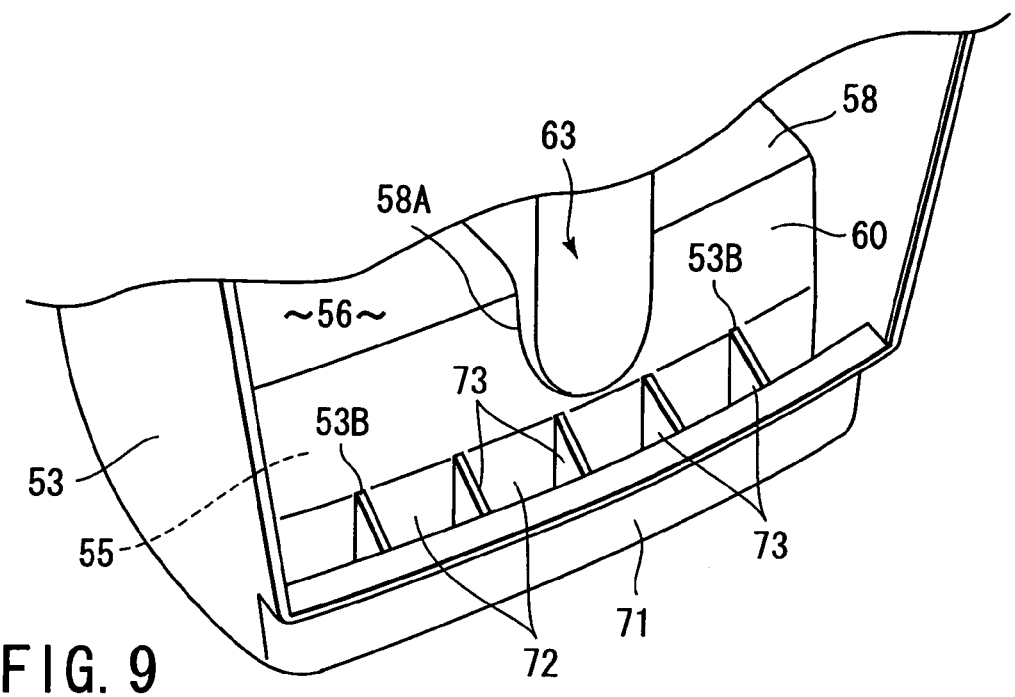
FIG. 9 is a perspective view showing the lower part of the dust cup of FIG. 5 seen from the rear side in the state in which a second dust separation section is removed.
Figure 10:
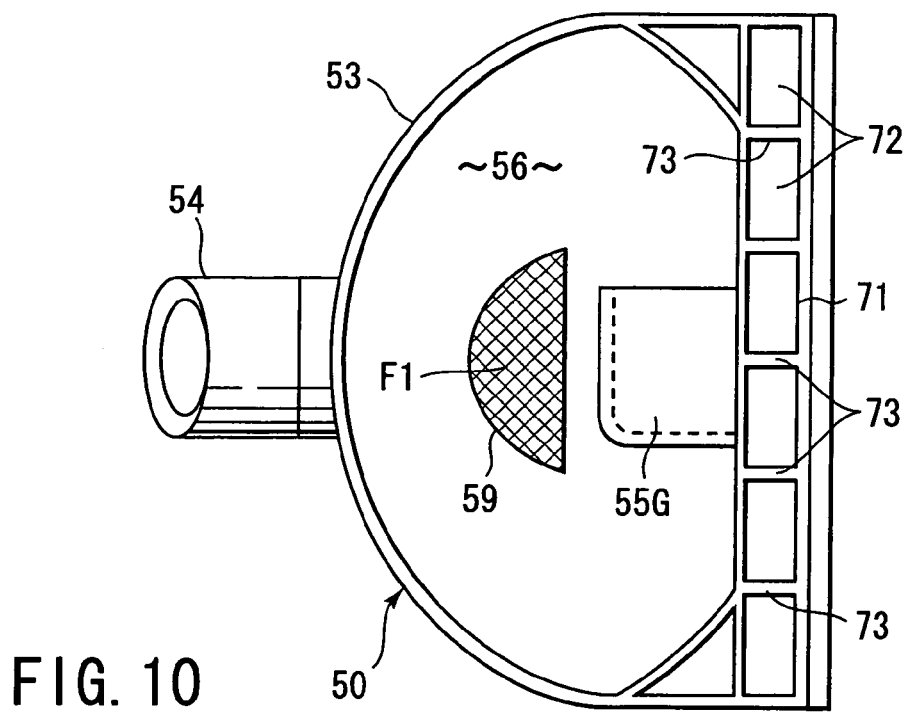
FIG. 10 is a bottom plan view showing the dust cup of FIG. 5 in a state in which a bottom plate is removed.

As shown in FIG. 6, the air hole 59 is formed in the ceiling wall 58 of the first dust accumulation section 55. The first dust accumulation section 55 communicates with the negative-pressure space 56 via the air hole 59. The air hole 59 is disposed opposite to substantially a middle part of the first dust accumulation section 55. As shown in FIGS. 5, 8, and 10, a filter F1 is attached to the air hole 59. The filter F1 is formed, for example, of a net.

A hole 58A (see FIGS. 7 and 9) is made in the ceiling wall 58 and located near the uprising wall 60. A guide wall 55G (see FIGS. 5 and 10) is disposed in the uprising wall 60. The guide wall 55G is disposed opposite to the hole 58A so as to generate a spiral flow in the first dust accumulation section 55.

The first dust separation section 61 is disposed in the negative-pressure space 56. The first dust separation section 61 includes a cylindrical air path forming member 62 and guide section 63. An inner space of the air path forming member 62 functions as a straight air path 62a. Via the guide section 63, the air path forming member 62 communicates with the first dust accumulation section 55 in order to guide the dust separated by the air path forming member 62 to the first dust accumulation section 55.

As shown in FIG. 5, the air path forming member 62 includes a linear axial line SL, and opposite ends of the axial direction are both opened. The air path forming member 62 includes a plurality of openings for separation 64 positioned at equal intervals between the opposite end openings. These openings 64 are closed by a filter F2 for trapping the dust.

Figure 7:
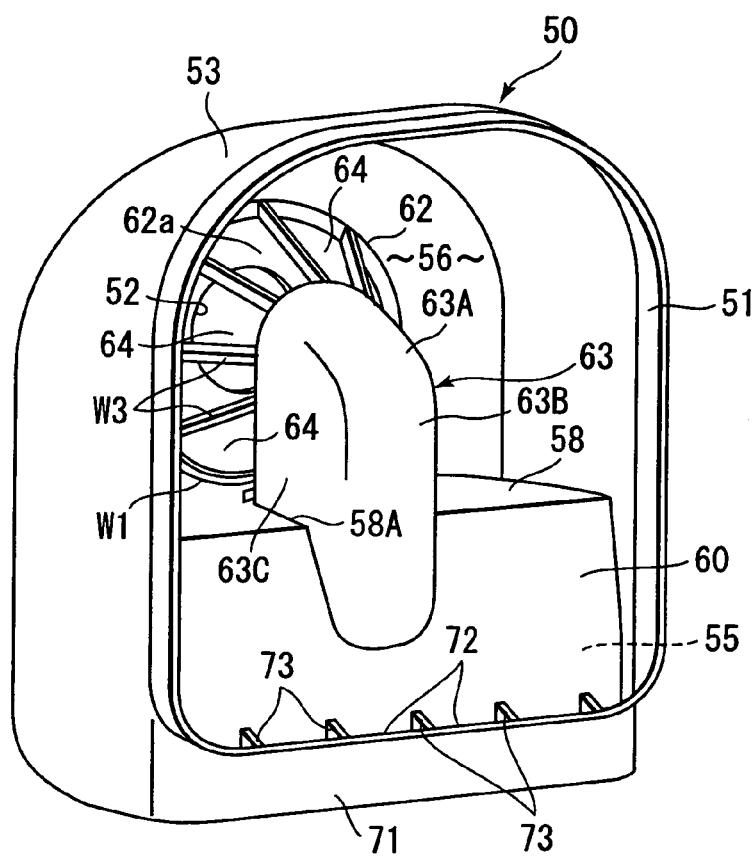
FIG. 7 is a perspective view showing the dust cup of FIG. 5 seen from a rear side in a state in which a second dust separation section is removed and additionally a filter of a first dust separation section is removed.

In detail, as shown in FIGS. 5, 7, 8, the air path forming member 62 includes a frame that comprises a pair of large and small circular frame sections W1, W2, and a plurality of ribs W3. The ribs W3 connect the frame section W1 to W2. Each opening 64 is formed of a space surrounded with the opposite frame sections W1, W2 and ribs W3. The filter F2 is formed, for example, of the net, and is attached to an inner peripheral surface of the frame in a cylindrical shape. Therefore, the air path forming member 62 forms the cylindrical shape, for example, as if opposite ends of a sieve in the axial direction were opened. The opening in one end of the air path forming member 62 in the axial direction forms an introductory port 62A. The opening in the other end of the air path forming member 62 in the axial direction forms a derivative port 62B.

An axial line SL of the air path forming member 62 which defines the straight air path 62a extends in the axial direction (forward/backward direction in the present embodiment) of the cleaner main body 20 as described above. The straight air path 62a communicates with the intake port 33A of the motor blower 33 successively via the opening 64 of the air path forming member 62 and the negative-pressure space 56 of the container case member 53.

As shown in FIGS. 5, 7, 8, the diameter of the large-diameter introductory port 62A of the air path forming member 62 is larger than that of the air hole 52 of the container case member 53. The air path forming member 62 is connected to the container case member 53. The air hole 52 is positioned in a region in which the introductory port 62A of the container case member 53 is projected in the front wall 50a. The diameter of the derivative port 62B of the air path forming member 62 is smaller than that of the introductory port 62A and the air hole 52. Accordingly, the diameter of the air path forming member 62 gradually decreases toward the derivative port 62B from the introductory port 62A.

The extending direction of the axial line SL of the air path forming member 62 substantially linearly continues with that of the axial line of the connection port 43 of the lid member 40. The intake port 33A of the motor blower 33 is disposed on extension of these axial lines. The connection port 43, the air hole 52, the straight air path 62a, the opening 51, and the intake port 33A of the motor blower 33 are successively arranged along the axial direction (forward/backward direction in the present embodiment) of the cleaner main body 20.

As shown in FIGS. 5, 7, the guide section 63 continues with the derivative port 62B of the air path forming member 62. The guide section 63 has a tubular shape, and includes an opening 63D bonded to the derivative port 62B. The guide section 63 includes an inclined wall section 63A and air-guiding wall section 63B to have the tubular shape. The inclined wall section 63A extends obliquely downwards from the upper part of the derivative port 62B. The air-guiding wall section 63B is curved from the inclined wall section 63A to extend downwards. This wall section 63B is disposed opposite to the derivative port 62B of the air path forming member 62.

The lower part of the guide section 63 forms a tube section 63C partially including the inclined wall section 63A. The tube section 63C extends, for example, in the vertical direction, and is connected to the ceiling wall 58 and uprising wall 60 so that the hole 58A is covered. By this connection, the guide section 63 connects the straight air path 62a to the first dust accumulation section 55.

The uprising wall 60 is disposed on an inner side (front side) slightly from the end of the opening 51 of the container case member 53. A depth H (see FIG. 5) leading to the uprising wall 60 from the opening 51 is used to attach the filter 80 described later to the container case member 53 so that the opening 51 is closed.

As shown in FIGS. 5 to 10, a support wall 71 is integrally disposed in the container case member 53. The support wall 71 is positioned outside the lower end of the uprising wall 60. A second dust accumulation section 72 whose upper end is opened is formed between the support wall 71 and uprising wall 60. The second dust accumulation section 72 is disposed so as to accumulate the dust separately from and independently of the first dust accumulation section 55. The second dust accumulation section 72 accumulates the dust finer than that accumulated in the first dust accumulation section 55. This second dust accumulation section 72 is divided into a plurality of regions by a plurality of support ribs 73. The support wall 71 and support ribs 73 support the filter 80 described later from below.

Lower-end openings of the second dust accumulation section 72 and first dust accumulation section 55 are juxtaposed. The lower-end openings of both the dust accumulation sections 55, 72 are closed by the bottom plate 57 so as to be openable/closable.

When one bottom plate 57 is opened, the dust accumulated in the first and second dust accumulation sections 55, 72 can simultaneously be discarded, and this is convenient to use. The second dust accumulation section 72 is formed in a concave shape including a dead end structure by the bottom plate 57. Any air current does not pass through the second dust accumulation section 72 structured in a blind alley state in this manner. Additionally, turbulence of the negative-pressure space 56 can be inhibited from spreading into the second dust accumulation section 72.

The second dust accumulation section 72 is not limited as long as a constitution is obtained for maintaining most of the dust accumulated inside in an accumulated state, when the turbulence propagates into the upper part of the section 72. Therefore, the dust can be permitted to soar substantially to an ignorable degree, when the influence of the turbulence spreads. A slanted or funneled baffle is not inhibited from being disposed in the second dust accumulation section 72. This baffle passes the dust falling down into the second dust accumulation section 72 from above, but suppresses the influence of the turbulence onto the second dust accumulation section.

An annular seal material (see FIG. 5) 74 is fixed to the inner surface of the bottom plate 57. The seal material 74 simultaneously keeps the lower ends of both the dust accumulation sections 55, 72 to be airtight in a closed state of the bottom plate 57. This is superior in that when the single seal material 74 is shared in this manner, the seal material is not required for each of the dust accumulation sections 55, 72. The second dust accumulation section 72 does not communicate with the first dust accumulation section 55 disposed adjacent to the second dust accumulation section. Therefore, the whole lower end of the uprising wall 60 contacts the inner surface of the closed bottom plate 57 to divide both the accumulation sections 55, 72. The seal material 74 can also be attached to the lower end surfaces of both the dust accumulation sections 55, 72.

The filter 80 is attached to the container case member 53 so as to be attachable/detachable so that the opening 51 is closed. The filter 80 functions as the second dust separation section. This filter 80 forms a shape extending in an arrangement direction of the negative-pressure space 56 and dust accumulation section 55. The filter 80 is formed in such a size that the filter can be fitted into the opening 51 of the container case member 53.

Therefore, the filter 80 fitted into the opening 51 is disposed, for example, over large parts of the rearward whole projection regions of the negative-pressure space 56 and dust accumulation section 55. In other words, the upper part of the filter 80 attached to the container case member 53 is disposed opposite to the negative-pressure space 56 and the first dust separation section 61 in the space. Additionally, the lower part of the filter 80 is disposed in the vicinity of and opposite to the uprising wall 60.

The container case member 53 includes regulating means. Concretely, as shown in FIG. 5, a step portion 53A positioned in a ceiling portion of the container case member 53 and a corner portion 53B forming a boundary between the uprising wall 60 and each rib 73 are disposed. These step portion 53A and corner portion 53B regulate a fit depth of the filter 80 with respect to the container case member 53.

By this regulation, the filter 80 is positioned upright, preferably tilted forwards, almost perpendicularly. The forward tilting indicates a state in which the upper end of the filter 80 is inclined so as to protrude from the lower end on the upstream side on the basis of the air current passing through the filter 80. It is to be noted that the filter element 82 described later may also be tilted forwards instead of tilting the whole filter 80. This constitution is also included in a concept that the filter is tilted forwards.

The forward tilting of the filter 80 is superior in that the dust sticking to the surface of the filter 80 on the upstream side is freely/easily dropped with the operation stop of the vacuum cleaner 10. In this case, the dust which is to fall cannot be disturbed by the dust sticking to a position below. It is to be noted that with the dust drop device, the filter 80 may also be disposed perpendicularly instead of being inclined forwards. It is also possible to dispose/tilt the filter slightly rearwards depending on cases.

A gap G is formed between the lower part of the filter 80 attached to the container case member 53 and the uprising wall 60. The gap G is much narrower than the negative-pressure space 56 which is disposed above and which communicates with the gap, and an air path sectional area is small. The lower end of the gap G communicates with the second dust accumulation section 72 which is positioned under the gap G.

As shown in FIGS. 5, 6, and 11, the filter 80 includes a filter frame 81 and a filter element 82 attached to the whole inside of the frame 81 so as to close the inside. The filter element 82 is formed of a filter material in a mat shape. This mat may have a flat plate shape or a pleated shape, and a single layer or a plurality of types of layers may also be stacked. In the filter material of the filter element 82, paper, cotton, cloth, glass wool, nonwoven cloth, foamed synthetic resin, and the like can be used. It is to be noted that reference numeral 87 of FIGS. 6 and 11 denotes an annular rubber seal packing fitted around the filter frame 81.

In the present embodiment, the pleated filter element 82 formed of a mat bent in a waveform shape in order to expand a filter area is used. The mesh of the filter element 82 is finer than that of the filters F1, F2 disposed on the upstream side of the element 82. As shown in FIG. 13, the pleated filter element 82 includes a surface groove 82*b* extending in the surface of the element in the vertical direction. The surface groove 82*b* opens forwards. Similarly, the filter element 82 includes a back surface groove 82*a* extending in the vertical direction in the back surface. The back surface groove 82*a* is opened rearwards.

As shown in FIG. 13, a surface treatment layer 82C is disposed in the surface on the upstream side of the filter element 82. The surface treatment layer 82C has gas permeability, and is a coating layer which reduces friction resistance of the surface on the upstream side and which smoothens a surface property. The surface treatment layer 82C having a low coefficient of friction inhibits the dust from sticking to the surface of the filter element 82. The surface treatment layer 82C is disposed, when fine particles of metals such as stainless steel, titanium, copper, and aluminum are attached to the surface on the upstream side, for example, by sputtering.

In this case, the metal fine particles are attached to the surface on the upstream side in the order of several angstroms so that the filter element 82 can maintain gas permeability required in filtering the fine dust. The surface treatment layer 82C is not limited to the fine particle layer of metal. For example, it may also be possible to immerse the filter element 82 into an ethylene tetrafluoride solution and to subsequently dry the element in a dry furnace, so that the surface treatment layer 82C is disposed in opposite front/back surfaces of the filter element 82.

The filter frame 81 supports the filter element 82 from four peripheries. A lower frame section 81*a* forming the lower end of the filter frame 81 includes element supports 84 and an oblique section 85 disposed under the supports as shown in FIGS. 6 and 12. The element supports 84 and oblique section 85 function as dust discharge section 83.

The element support 84 include closing portions 84*a* and cutout portions 84*b* which are alternately arranged. These closing portions 84*a* and cutout portions 84*b* are disposed opposite to the pleats of the filter element 82 at predetermined pitches.

The closing portions 84*a* close the lower ends of the back surface grooves 82*a* of the filter element 82, and are fitted/bonded into the lower ends. The cutout portions 84*b* function as dust passing portions. The cutout portions 84*b* are formed to open on the front side (upstream side) of the filter frame 81. This cutout portion 84*b* is disposed not to close the lower end of the surface groove 82*b* of the filter element 82.

As shown in FIG. 12, element supports 86 similar to the element supports 84 are also disposed in an upper frame portion 81*b* of the filter frame 81. The upper end of the filter element 82 is bonded to the element support 86. Since the upper and lower ends of the filter element 82 are bonded to both the element supports 84, 86, air channels can be prevented from being formed over the front/back surface of the filter element 82 in the upper/lower part of the filter frame 81.

The oblique section 85 protrudes from rear edges of the element supports 84 (edges on a downstream side) obliquely in a forward/downward direction. The oblique section 85 is disposed opposite to the cutout portions 84*b*. A space formed between the oblique section 85 and element supports 84 extends in a width direction of the filter frame 81. This space communicates with the surface grooves 82*b*. A forward protruding width of the oblique section 85 is smaller than that of the closing portion 84*a*. Accordingly, the space communicates with the second dust accumulation section 72 below the space.

Figure 14:
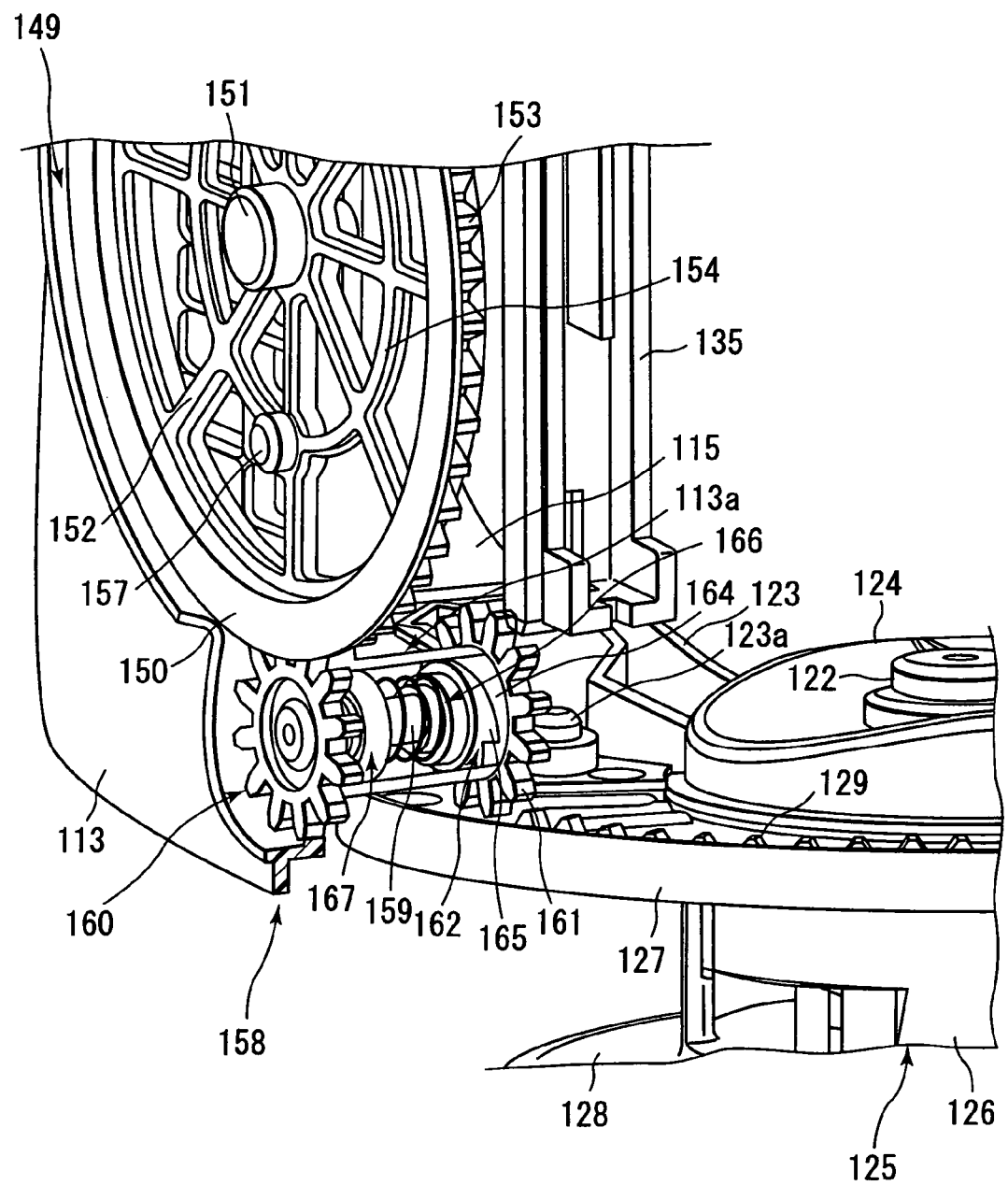
FIG. 14 is a perspective view showing a relation between a dust drop device and a cord reel of the vacuum cleaner of FIG. 1 seen from a front side.
Figure 15:
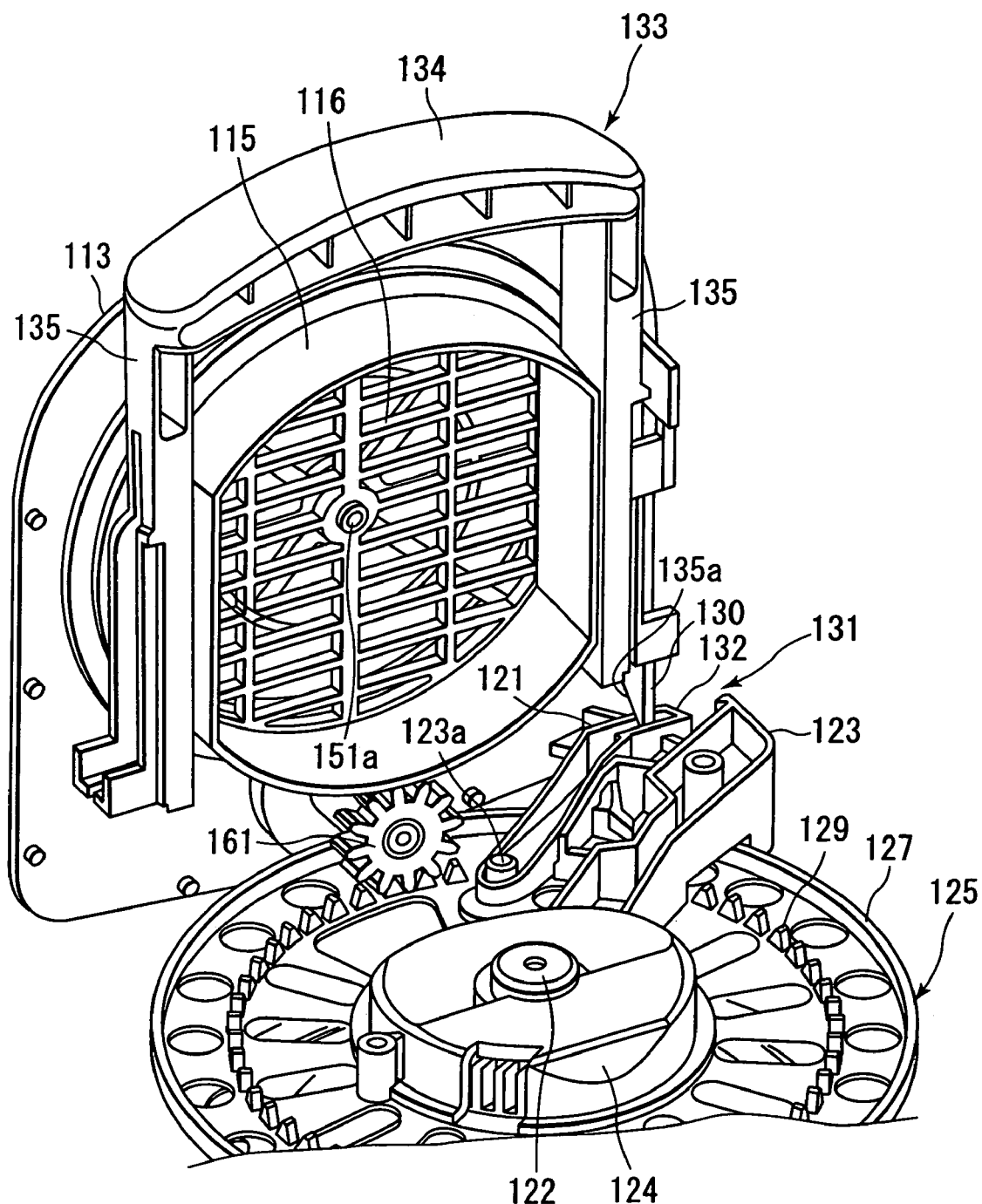
FIG. 15 is a perspective view showing the relation between the dust drop device and the cord reel of the vacuum cleaner of FIG. 1 seen from the rear side.
Figure 16:
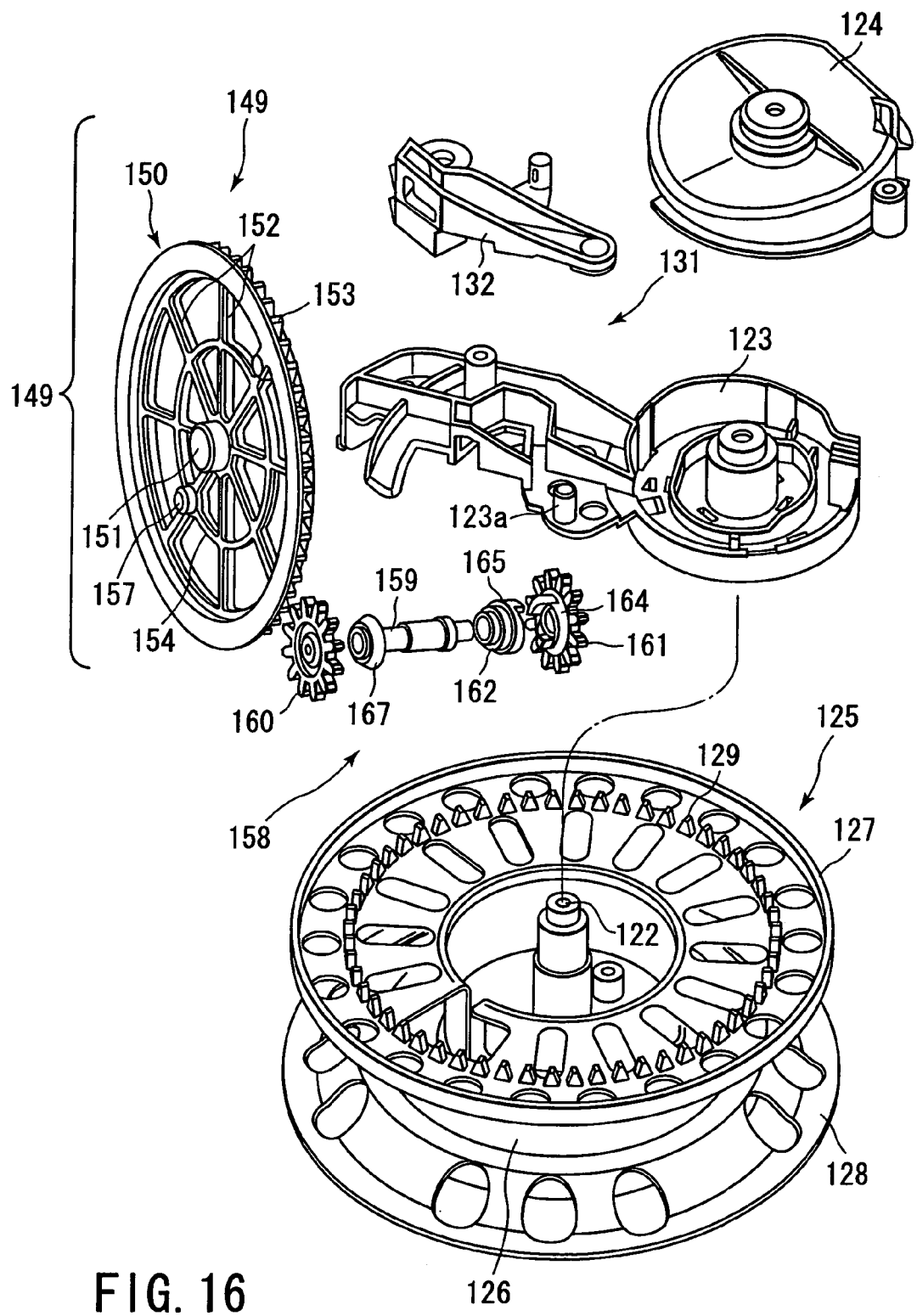
FIG. 16 is a perspective view showing the dust drop device of FIG. 15 together with the cord reel.

As shown in FIGS. 14 to 16, the cord reel 125 built in the case main section 34 includes a take-up drum 126, brake device 131, and the like. The take-up drum 126 is rotatably attached to a support shaft 122, and rotated by an urging force of a power spring (not shown). When this take-up drum 126 rotates, a power cord KD (see FIG. 3) is wound up. The support shaft 122 is vertically disposed on a bottom part of the main-body case 30.

The take-up drum 126 includes an upper flange 127 and lower flange 128. A large-diameter driving gear 129 is disposed in the upper surface of the upper flange 127. The gear 129 is formed of a large number of teeth annularly arranged in a peripheral direction of the upper flange 127.

A base plate 123 and base plate presser 124 are attached to the support shaft 122. The brake device 131 is attached to the base plate 123. The brake device 131 includes a brake arm 132, brake roller (not shown), and spring (not shown).

As shown in FIG. 16, the base plate 123 includes a vertical pivot 123*a*, and the brake arm 132 is rotatably attached to the pivot 123*a*. The brake roller is attached to a free end of the brake arm 132. The spring urges the brake arm 132 in a direction in which the brake roller contacts the peripheral surface of the upper flange 127 with pressure.

For the brake device 131, the brake roller is pushed into a gap between the brake arm 132 and upper flange 127 like a wedge, to lock the rotation of the take-up drum 126. The brake roller is so pushed by the spring for urging the brake arm 132 and the power spring (not shown) for urging the take-up drum 126.

When the power cord KD is drawn out, the take-up drum 126 is rotated against the urging force of the spring. Accordingly, the brake roller is slightly moved in the rotation direction of the take-up drum 126. Therefore, the state in which the brake roller bites like the wedge between the brake arm 132 and upper flange 127 is released. That is, a press-contact state of the brake roller onto the upper flange 127 is released.

When the drawing of the power cord KD is stopped, the take-up drum 126 slightly rotates in a direction for winding up the power cord KD by the power spring. Accordingly, the brake roller bites like the wedge between the brake arm 132 and upper flange 127 to stop the rotation of the take-up drum 126. Therefore, the power cord KD is held in a drawn state.

Figure 2:
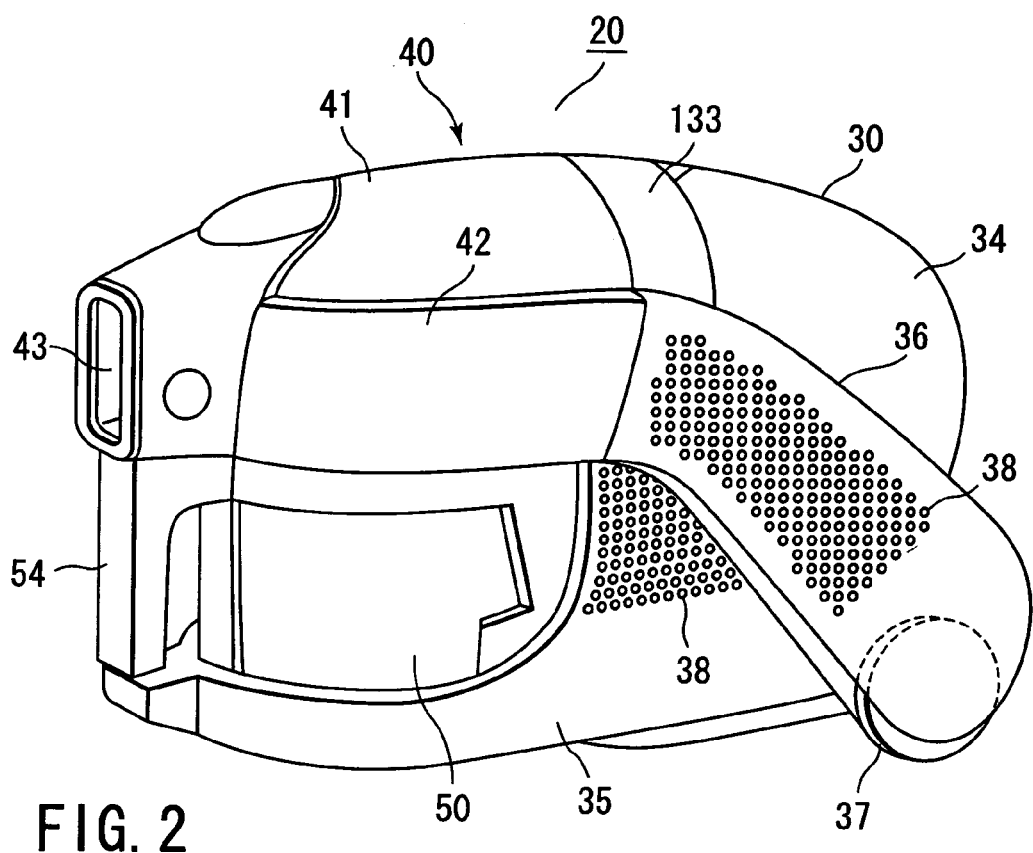
FIG. 2 is a perspective view showing a cleaner main body of the vacuum cleaner of FIG. 1.

The brake of the brake device 131 is released, when a handle 133 shown in FIGS. 2 and 15 is pressed downwards. The handle 133 includes a handle section 134 and leg sections 135, 135 integrally connected to the opposite ends of the handle section 134 and extending downwards, and is formed in an inverted U shape. The handle 133 can be drawn upwards above the main-body case 30, and is used to carry the cleaner main body 20 in this state. The handle 133 is usually held in a position where the handle section 134 does not project from the main-body case 30, and pushed in from this state at the time of brake release.

A tapered plate 130 is disposed in the lower end of one leg section 135. An inclined cam surface 135*a* of the plate 130 contacts a rib 121 of the brake arm 132 from above. By an operation for pressing downwards the handle 133, the brake arm 132 is rotated counterclockwise centering on the pivot 123a. By this rotation, the brake roller is detached from the peripheral surface of the upper flange 127. Therefore, the brake is released by the brake device 131.

In the case main section 34, dust drop devices for dropping off the dust sticking to the filter 80 such as a vibration applying device 149 are disposed.

This vibration applying device 149 includes a lattice plate 116, and a large-diameter gear 150 disposed between the lattice plate 116 and filter 80. The lattice plate 116 is disposed on the back side of a front wall 113 of the case main section 34. The front wall 113 includes an opening disposed opposite to the lattice plate 116. The gear 150 is disposed inside the opening. This gear 150 includes a boss 151, a plurality of arms 152, an annular gear section 153, an annular support section 154, and a protrusion 157.

The boss 151 positioned in a middle part of the gear 150 is rotatably supported by a support shaft 151a of the lattice plate 116. Each arm 152 is disposed radially centering on the boss 151 and integrally with the boss 151. The gear section 153 is integrally disposed over the respective arms 152.

The support section 154 is positioned between the boss 151 and the annular gear section 153, and is disposed integrally with each arm 152. The protrusion 157 is disposed in one of intersections between the annular support section 154 and the arms 152. The protrusion 157 can be elastically deformed, and the tip end of the protrusion is fitted shallowly in one back surface groove 82a of the filter element 82.

As shown in FIG. 17, the gear 150 links with the cord reel 125 via a rotary force transmission mechanism 158. This rotary force transmission mechanism 158 includes a rotation shaft 159, a first pinion (small-diameter gear) 160 which is a link element, and a second pinion (small-diameter gear) 161 which is a driving rotary member.

As shown in FIGS. 14 and 17, the lattice plate 116 includes a cylindrical section 113a and a shaft through hole 113b which communicates with the section. The rotation shaft 159 is disposed through the cylindrical section 113a and shaft through hole 113b. One end of the rotation shaft 159 projects toward the dust cup 50, and the other end projects into the case main section 34.

The first pinion 160 is fixed to one end of the rotation shaft 159. The pinion 160 meshes with the annular gear section 153 of the gear 150. The pinion 160 includes a boss 160a which is fitted into the shaft through hole 113b.

The second pinion 161 is rotatably supported by the other end of the rotation shaft 159, and is disposed in an axial line direction of the rotation shaft 159 so as to be immobile. The pinion 161 meshes with the driving gear 129 of the cord reel 125 to link with the cord reel 125. In FIGS. 17, 18, and 19, a reference numeral 159a denotes a guide convex portion, and this guide convex portion 159a is formed so as to extend in a direction parallel with the axial line in the peripheral surface of the rotation shaft 159.

The rotary force transmission mechanism 158 includes a cylindrical driven rotary member 162. This rotary member 162 is fitted into a portion in which the guide convex portion 159a of the rotation shaft 159 is disposed, and is disposed between the first pinion 160 and lattice plate 116. Accordingly, the rotary member 162 is supported by the rotation shaft 159 so that the rotary member is movable in the axial line direction and is not relatively rotatable.

The rotary force transmission mechanism 158 includes a one way clutch 163. The main part of the clutch 163 is disposed in a portion in which the second pinion 161 is disposed opposite to the driven rotary member 162. The one way clutch 163 includes ratchet claws 164, 165 engaged with each other, and a coil spring 166. The ratchet claw 164 is disposed in the pinion 161. The ratchet claw 165 is disposed in the driven rotary member 162. The coil spring 166 presses the ratchet claw 165 onto the ratchet claw 164.

When the cord reel 125 is rotated in a direction for drawing out the power cord KD, the ratchet claws 164, 165 are rotated with respect to each other. Against a spring force of the coil spring 166, the driven rotary member 162 is moved on the rotation shaft 159 in a direction detached from the pinion 161. Accordingly, the ratchet claw 164 rides over the ratchet claw 165. Conversely, when the cord reel 125 is rotated in a direction for winding up the power cord KD, the ratchet claws 164, 165 are engaged with each other. Accordingly, the pinion 161 is rotated integrally with the driven rotary member 162.

As shown in FIG. 17, the rotary force transmission mechanism 158 includes an annular seal member 167 which seals between the shaft through hole 113b and rotation shaft 159. The seal member 167 fits into the outer periphery of the rotation shaft 159 and abuts on the lattice plate 116. The coil spring 166 is interposed between the seal member 167 and driven rotary member 162.

The coil spring 166 presses the seal member 167 onto the lattice plate 116. Accordingly, the coil spring 166 presses the ratchet claw 165 of the driven rotary member 162 onto the ratchet claw 164 of the pinion 161. The seal member 167 is pressed between the shaft through hole 113b and a boss 160a of the pinion 160. Accordingly, a space between the rotation shaft 159 and shaft through hole 113b is also sealed by the seal member 167.

In FIGS. 14 and 15, a reference numeral 115 denotes a cylindrical section disposed in the lattice plate 116. The intake port 33A of the motor blower 33 is fitted into the cylindrical section 115 via an annular rubber elastic member (not shown).

An operation of the vacuum cleaner 10 that comprises as described above will be described.

Figure 4:
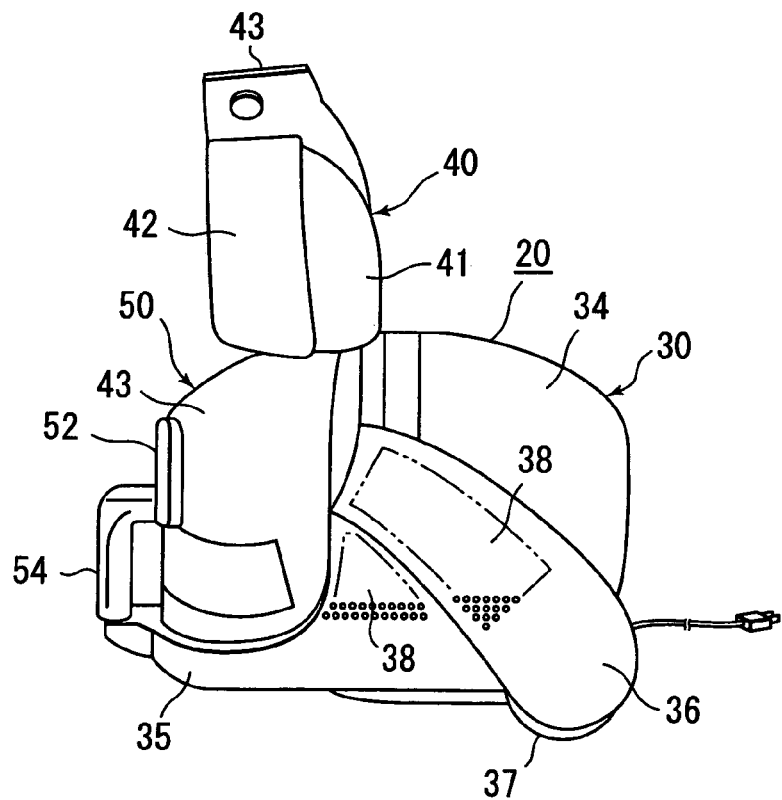
FIG. 4 is a side view showing the cleaner main body of FIG. 2 in a state in which a lid member is opened.

As shown in FIG. 4, the dust cup 50 is laid on the cup receiver section 35 of the main-body case 30. Thereafter, after closing the lid member 40 as shown in FIGS. 2 and 3, the dust suction hose 21 of the intake passage member 25 is connected to the connection port 43 of the lid member 40 as shown in FIG. 1. The dust suction hose 21 is already connected to the draw-in port member 24 via the extension pipe 23.

In this state, the operation switch 22B of the handling operation section 22 is operated to drive the motor blower 33. Accordingly, the negative-pressure space 56 of the dust cup 50 which communicates with the intake port 33A of the motor blower 33 is brought into a negative pressure. This negative pressure successively acts on the openings 64 and straight air path 62a of the air path forming member 62, the air hole 52 of the container case member 53, the connection port 43 of the lid member 40, the dust suction hose 21, the extension pipe 23, and the draw-in port member 24. Accordingly, the dust on the plane to be cleaned is sucked from the draw-in port member 24 together with air.

The sucked dust and air are passed through the intake passage member 25 and sucked into the connection port 43. The dust and air sucked into the connection port 43 are passed through the air hole 52 of the dust cup 50 and sucked into the straight air path 62a of the first dust separation section 61.

A part of the air sucked into the straight air path 62a is sucked into the negative-pressure space 56 of the container case member 53 through the first filter F2 of the opening 64 of the air path forming member 62, and further sucked into the intake port 33A of the motor blower 33 through the filter 80.

Of the dust sucked into the straight air path 62a linearly extending in the forward/backward direction of the cleaner main body 20 together with the air, the dust including a mass which is not less than a predetermined mass rapidly diverts the direction by the inertia and cannot pass through the openings 64. Therefore, the dust having the mass is separated from the air passing through the openings 64 and goes straight in the air path 62a. The dust going straight in the straight air path 62a collides with the air-guiding wall section 63B of the guide section 63, and is introduced into the first dust accumulation section 55 along the guide section 63.

The air which has not sucked outwards into the negative-pressure space 56 from the openings 64 is passed through the guide section 63 in the same manner as in the dust having the mass, and is introduced into the first dust accumulation section 55. The air introduced into the first dust accumulation section 55 forms a downward spiral flow which rotates along the inner peripheral surface of the first dust accumulation section 55 by the guide wall 55G.

Therefore, the dust introduced into the first dust accumulation section 55 is compressed and accumulated along the lower inner peripheral surface of the first dust accumulation section 55 by the spiral flow. The air which revolves in the first dust accumulation section 55 rises/inverts in the middle part in the first dust accumulation section 55, and is passed through the air hole 59 of the ceiling wall 58 and sucked into the negative-pressure space 56.

On the other hand, the light dust leading into the air path 62a of the air path forming member 62 has a small inertial force with which the dust is going to flow straight. Therefore, the light dust does not flow straight in the straight air path 62a, and flows into the negative-pressure space 56 on the air passing through the filter F2 of the opening 64 by a suction negative pressure of the motor blower 33. Accordingly, the light dust sticks to the inner peripheral surface of the filter F2.

When the filter F2 is largely clogged by the sticking, an amount of air passing through the filter F2 decreases. At this time, the negative pressure of the negative-pressure space 56 increases by the decrease. Accordingly, the negative pressure in the first dust accumulation section 55 also increases through the air hole 59 of the ceiling wall 58.

Therefore, air velocity and flow rate of the air going straight in the straight air path 62a increase. With the increase of the air velocity with which the air goes straight in the air path 62a, the air going straight easily peels off the dust sticking to the filter F2.

That is, the diameter of the cylindrical air path forming member 62 gradually decreases toward the derivative port 62B on the downstream side from the introductory port 62A on the upstream side. Accordingly, the air going straight in the air path 62a uniformly abuts on the whole surface of the filter F2 and flows in the vicinity of the middle part of the straight air path 62a. Therefore, the air going straight in the air path 62a easily peels off the dust sticking to the inner suction of the filter F2.

When the clogging of the filter F2 proceeds in this manner, the flow rate of the air going straight in the air path 62a increases, and the flow rate of the air sucked by the motor blower 33 is kept to be substantially constant. Therefore, regardless of the clogging of the filter F2, it is possible to constantly suck the dust with a predetermined suction force.

The dust peeled from the filter F2 is introduced into the first dust accumulation section 55 through the guide section 63 in the same manner as the dust which has a large mass, centrifugally separated from the air, and accumulated in the dust accumulation section 55.

As described above, in the first dust separation section 61, the inertial force with which the dust having a large mass such as the coarse dust is to go straight is used to separate this dust from the air. This separation function will be referred to as a straight flow inertia separation function. In this separation function, the windage is small as compared with a case in which the dust-containing air is rotated, the proceeding direction of the spiral flow is inverted, and the dust is centrifugally separated from the air.

The air hole 52, the straight air path 62a, the upper part of the opening 51 of the container case member 53, and the intake port 33A of the motor blower 33 are disposed substantially in the same height position, and are successively arranged in the forward/backward direction. Therefore, the air sucked into the motor blower 33 from the air path 62a through the filter F2 and negative-pressure space 56 flows substantially linearly in substantially the same height position as represented by an arrow Q in FIG. 3, and the flow does not largely change. Accordingly, the windage is reduced, and it is possible to sufficiently fulfill the function of the motor blower 33.

The connection port 43 of the lid member 40 and the cylindrical air path forming member 62 are linearly arranged. In other words, an introduction direction of the dust-containing air introduced into the air hole 52 of the container case member 53, and the extending direction of the air path forming member 62 are linear. Even in this constitution, the windage can be reduced.

The air in the negative-pressure space 56 is passed through the filter 80 and sucked into the motor blower 33. Therefore, the fine dust passed through the filters F1, F2 can be filtered by the filter element 82 of the filter 80. The air purified in this manner is sucked into the motor blower 33.

The first dust separation section 61 is disposed on the upstream side of the filter 80. The coarse dust, and the like are separated in the first dust separation section 61 as described above. Accordingly, the large dust to be removed by the first dust separation section 61 does not stick to the filter 80. Therefore, the filter 80 can be prevented from being apparently clogged at an early stage.

In this case, the filter 80 extends in an arrangement direction of the negative-pressure space 56 including the first dust separation section 61 and the dust accumulation section 55, and is disposed opposite to the negative-pressure space 56 and dust accumulation section 55. In other words, the filter 80 disposed between the first dust separation section 61 and motor blower 33 is disposed in not only a projection region of the first dust separation section 61 but also that of the dust accumulation section 55. Therefore, the filter 80 can be enlarged without being limited by the size of the dust accumulation section 55. Nevertheless the container case member 53 and cleaner main body 20 are not enlarged.

The filter 80 forming the second dust separation section filters the dust with the whole large filter element 82. Accordingly, the windage of the filter 80 can be reduced, and the turbulence can be inhibited from being formed. Therefore, a timing at which the filter element 82 is clogged and the windage becomes excessively large is delayed. Therefore, intervals of maintenance required to be carried out by a user, such as the rinsing and cleaning of the filter element 82 and the changing with a new filter 80, that is, a continuous usable period of the filter 80 can be lengthened.

When the windage by the filter 80 can be reduced as described above, a force for sucking the dust-containing air into the connection port 43 of the cleaner main body 20 does not easily drop. Accordingly, the flow rate of the air passed through the straight air path 62a of the first dust separation section 61 is inhibited from dropping. Therefore, the separation function in the first dust separation section 61 can be inhibited from dropping at the early stage. In other words, it is possible to inhibit a cleaning capability from dropping at the early stage.

The filter 80 is tilted. Therefore, a part of the main flow Q which has abutted, for example, on the upper part (one end) of the filter element 82 is introduced toward the lower part of the element 82 along the inclination of the filter element 82.

The filter element 82 is pleated, and used in a posture in which creases of the element extend in the vertical direction. Accordingly, a large number of surface grooves 82b of the filter element 82 extending in the vertical direction can be used as guides to easily spread the air also in the lower region of the filter element 82. Therefore, while the main flow Q is maintained, substantially the whole filter element 82 can preferably be used to filter the fine dust.

The filter 80 raised and used in a posture in which the pleats extend in the vertical direction attracts mainly the dust by the surface on the upstream side. Most of the dust which has stuck to the surface on the upstream side falls with its own weight with the stopping of the operation of the motor blower 33.

The surface treatment layer 82C is disposed in the surface of the filter element 82 on the upstream side. By the treatment layer 82C, the dust sticking to the surface of the filter element 82 easily peels, and can be inhibited from being caught by the surface of the filter material. Therefore, the dust on the surface of the filter element 82 on the upstream side is smoothly and easily dropped as compared with a case in which the dust directly sticks to the surface of the filter material of the filter element 82.

The dust which has fallen passes through the cutout portions 84b of the lower frame section 81a of the filter frame 81. This dust slips off the oblique section 85 disposed under the filter element 82. Accordingly, the dust which has fallen from the filter 80 is discharged downwards via the lower frame section 81a, and accumulated in the second dust accumulation section 72.

The lower frame section 81a of the filter frame 81 which supports the lower end of the filter element 82 does not stop the dust falling from the filter element 82. Accordingly, the dust grows upwards in the surface grooves 82b, and the lower part of the filter element 82 can be inhibited from being clogged.

Therefore, the continuous usable period of the filter 80 can be lengthened. Additionally, there is not a possibility that the dust is accumulated and hardened in the lower parts of the surface grooves 82b of the filter element 82. Therefore, even when the filter element 82 is rinsed and cleaned, the labor of cleaning can be reduced.

As described above, the dust which has fallen from the surface of the filter element 82 is not stopped by the lower frame section 81a of the filter frame 81, and the falling dust can be discharged downwards to the second dust accumulation section 72. Therefore, when the upper part of the filter element 82 is clogged, a substantial filter part can be secured in the lower part of the filter element 82. Even in this respect, the continuous usable period of the filter 80 can be lengthened.

The element supports 84 which support the lower end of the filter element 82 are covered with the oblique section 85 of the lower frame section 81a from below. Therefore, in the handlings of the filter 80 such as maintenance, the oblique section 85 can prevent the lower end of the filter element 82 from hitting something. Therefore, reliability is high in maintaining predetermined bond of the filter element 82 onto the element supports 84.

The concave second dust accumulation section 72 formed in the lower end of the dust cup 50 is closed by the bottom plate 57. Therefore, the air does not flow through the second dust accumulation section 72. Additionally, the second dust accumulation section 72 deviates from the main flow shown by the arrow Q in FIG. 3, and is disposed downwards largely apart from the main flow. Additionally, the gap G is narrowed to such an extent that the passage of the dust falling from the surface of the filter element 82 is permitted, and the turbulence is effectively inhibited from being generated in the gap G. Furthermore, the upper end opening of the second dust accumulation section 72 is covered with the lower frame section 81a of the filter frame 81 except one part.

Accordingly, every time the operation of the motor blower 33 is restarted, the turbulence made in the negative-pressure space 56 by the main flow Q does not easily spread in the second dust accumulation section 72. Therefore, the fine dust accumulated in the second dust accumulation section 72 soars, and this dust can be inhibited from sticking to the surface of the filter element 82 again. Accordingly, the filter element 82 can be inhibited from being clogged at the early stage.

Furthermore, when the dust is inhibited from sticking again as described above, air path resistance in the filter element 82 is inhibited from increasing at the early stage. Therefore, a capability of actually drawing the dust-containing air into the connection port 43 by a suction force of the motor blower 33 does not easily drop, and cleaning capability can be enhanced.

The air is separated from the dust by the straight flow inertia separation function described above in the first dust separation section 61. Accordingly, an energy of the main flow Q is enlarged, and flow route is clarified. In other words, a flow position of the air passed through the filter element 82 from the openings 64 via the negative-pressure space 56 is roughly determined. Accordingly, since the generation of the turbulence in the negative-pressure space 56 can be reduced, the influence of the turbulence onto the second dust accumulation section 72 can further be inhibited.

For the vacuum cleaner 10, every time the power cord KD is extracted/inserted with respect to the cord reel 125, in conjunction with this, the vibration applying device 149 vibrates the filter element 82. Accordingly, the fine dust sticking to the filter element 82 can forcibly be dropped.

To take up the power cord KD pulled out of the cleaner main body 20, first the handle section 134 of the handle 133 is depressed from a position shown in FIGS. 2 and 3.

When the handle 133 is depressed, the brake of the brake device 131 of the cord reel 125 is released. Accordingly, the take-up drum 126 of the cord reel 125 is rotated by the urging force of the power spring to wind up the power cord KD.

In conjugation with the rotation of the take-up drum 126, the gear 150 is rotated via the rotary force transmission mechanism 158. By the rotation of the gear 150, the protrusion 157 of the gear 150 rides over the pleats of the pleated filter element 82 and moves.

The protrusion 157 collides with the next pleat, when riding over the pleat of the filter element 82, and vibrates the filter element 82. When the vibration is applied in this manner, the fine dust drops from the filter element 82. The dust which has dropped is accumulated in the second dust accumulation section 72 as described above.

When the power cord KD is pulled out of the cord reel 125, the take-up drum 126 rotates. Therefore, the vibration applying device 149 vibrates the filter element 82 to automatically drop off the dust in the same manner as in a case in which the power cord KD is wound up.

Figure 20:
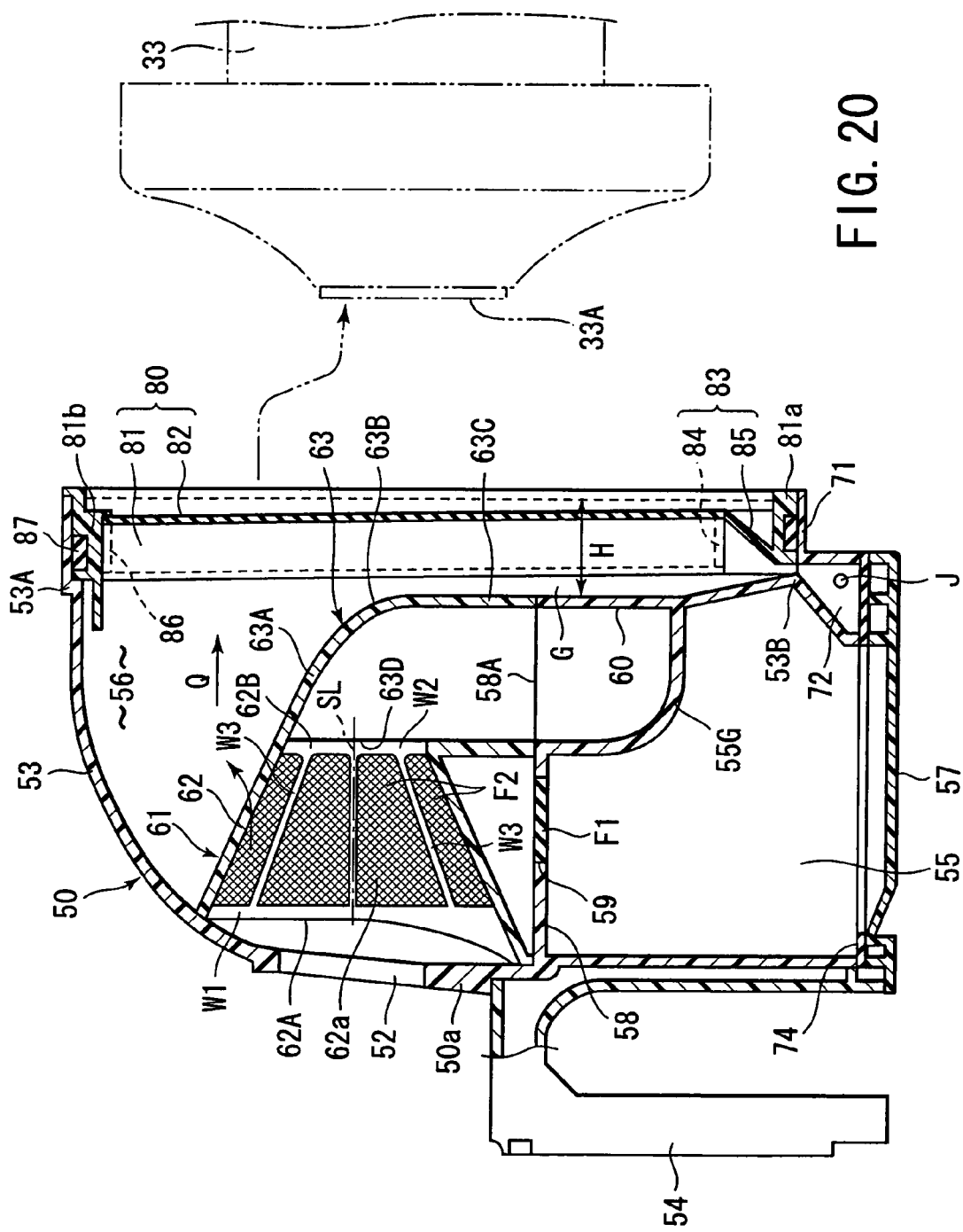
FIG. 20 is a longitudinal sectional view showing the dust cup of the vacuum cleaner according to a second embodiment of the present invention.

FIG. 20 shows a second embodiment of the present invention. The second embodiment is basically the same as the first embodiment. Therefore, the same constitution as that of the first embodiment is denoted with the same reference numerals as those of the corresponding constitution of the first embodiment, and the description is omitted. Since the constitution of the second dust accumulation section 72 of the second embodiment is different from that of the first embodiment, this respect will be described hereinafter.

The second dust accumulation section 72 is at, a position deviating from right under the filter 80. For example, a greater of the second dust accumulation section 72 is inserted in the first dust accumulation section 55. In other words, the second dust accumulation section 72 is disposed in a position deviating from the flow of the air (main flow Q) passed through the filter 80 from the first dust separation section 61 via the negative-pressure space 56 and sucked into the motor blower 33.

Accordingly, the inside of the second dust accumulation section 72 is broadened with respect to the inlet. The second dust accumulation section 72 is preferable in that the section is not easily influenced by the turbulence of the negative-pressure space 56. The constitution of the second embodiment other than that described above, including a constitution not shown in FIG. 20, is the same as that of the first embodiment.

Figure 21:
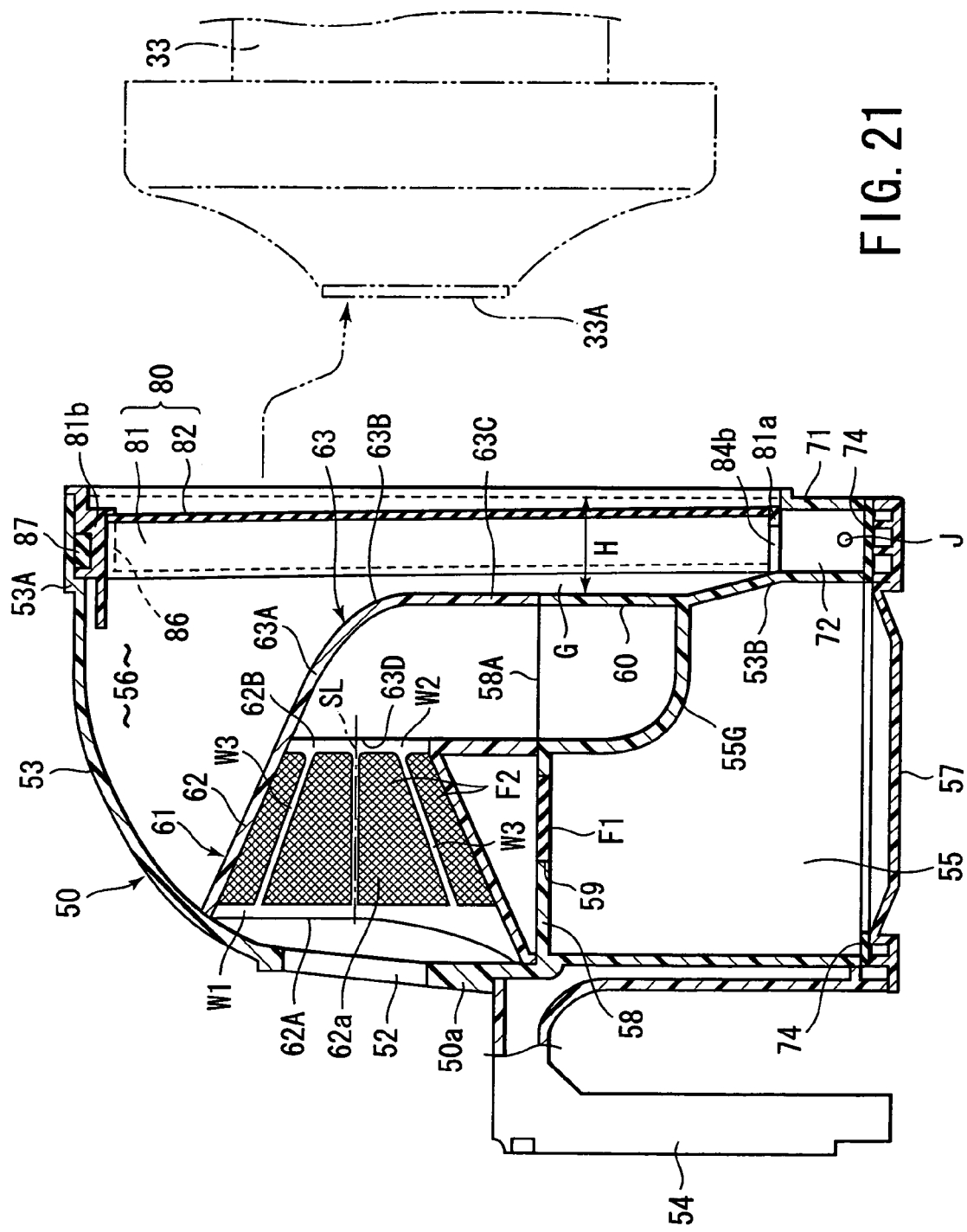
FIG. 21 is a longitudinal sectional view showing the dust cup of the vacuum cleaner according to a third embodiment of the present invention.
Figure 22:
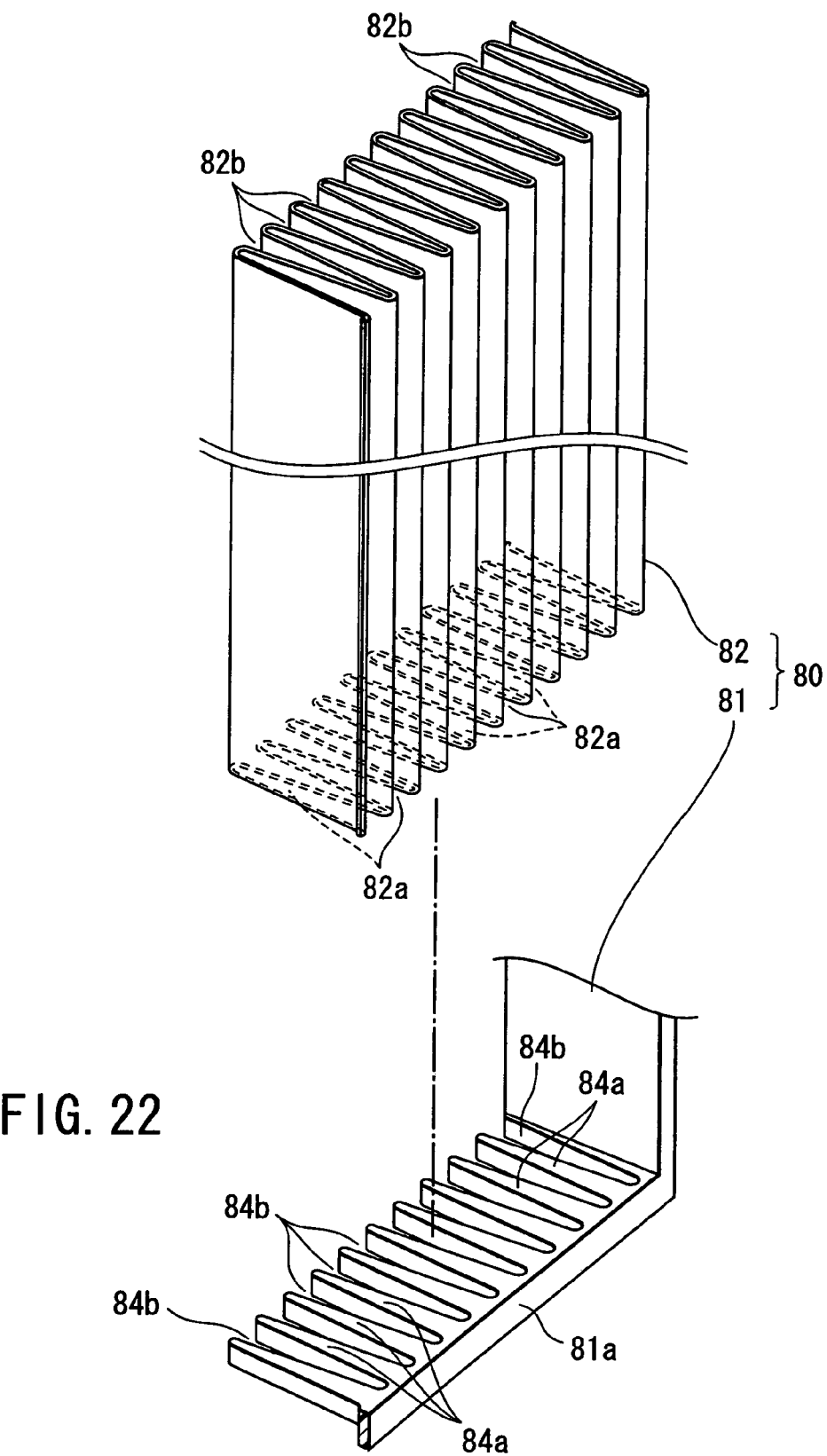
FIG. 22 is a perspective view showing a part of the second dust separation section disposed in the dust cup of FIG. 21.

FIGS. 21 and 22 show a third embodiment of the present invention. The third embodiment is basically the same as the first embodiment. Therefore, the same constitution as that of the first embodiment is denoted with the same reference numerals as those of the corresponding constitution, and the description is omitted. Since the third embodiment is different from the first embodiment in the lower frame section 81a and dust discharge means 83 of the filter 80, this respect will be described hereinafter.

As shown in FIG. 22, the closing portions 84a and cutout portions (dust through portions) 84b are alternately arranged in the lower frame section 81a. The lower frame section 81a does not include the oblique section employed in the first embodiment. Therefore, the lower frame section 81a is directly supported by the second dust accumulation section 72 as shown in FIG. 21 in a state in which the filter 80 is fitted into the opening 51. In this state, the closing portions 84a and cutout portions 84b are disposed opposite to the second dust accumulation section 72. The constitution of the third embodiment, including the constitution not shown in FIGS. 21 and 22, is the same as that of the first embodiment except the above-described respect.

As described above, the present invention is effective in a field of a vacuum cleaner which is useful for sucking dust on a surface to be cleaned together with air to clean the surface to be cleaned.

What is claimed is:

1. A vacuum cleaner in which a motor blower including an intake port is built in a cleaner main body including a connection port, comprising:
    a first dust separation section which is disposed between the connection port and the intake port and which includes a cylindrical air path forming member to separate air and dust flowing toward the intake port through the connection port;
    a first dust accumulation section which accumulates the dust separated by the first dust separation section; and
    a second dust separation section which includes a mat-like filter element and which is disposed between the first dust separation section and the motor blower,
    wherein an axial line of the air path forming member is linear, and the air path forming member includes an introductory port, facing the connection port, into which dust-containing air passed through the connection port is introduced, a derivative port, facing the introductory port, via which the separated dust is derived, and an opening which is covered with a filter and disposed between the introductory port and derivative port and via which a part of the air flowing in the air path forming member toward the derivative port from the introductory port is sucked into the intake port to separate the air from the dust going straight in the air path forming member toward the derivative port from the introductory port with inertia, the diameter of the air path forming member gradually decreasing toward the derivative port from the introductory port,
    wherein the derivative port and the first dust accumulation section are communicated by a tubular guide section.

2. The vacuum cleaner according to claim 1, further comprising:
    a second dust accumulation section which accumulates the dust falling from the filter element separately from the first dust accumulation section and which is disposed under the second dust separation section.

3. The vacuum cleaner according to claim 2, wherein the second dust accumulation section is disposed in a position which deviates from a flow of the air leading to the intake port from the first dust separation section.

4. The vacuum cleaner according to claim 1, wherein the first dust separation section and first dust accumulation section are juxtaposed, and the second dust separation section disposed between the first dust separation section and the motor blower is disposed over at least one part of a projection region of the first dust accumulation section and the projection region of the first dust separation section.

5. A vacuum cleaner in which a motor blower including an intake port is built in a cleaner main body including a connection port, comprising:
    a first dust separation section which is disposed between the connection port and the intake port and which includes a cylindrical air path forming member to separate air and dust flowing toward the intake port through the connection port;
    a first dust accumulation section which accumulates the dust separated by the first dust separation section;
    a second dust separation section which includes a mat-like filter element raised for use and which is disposed between the first dust separation section and the motor blower and in which the air leading to the intake port from the first dust separation section is mainly passed through an upper part of the filter element;
    a partition wall which partitions a negative-pressure space containing the first dust separation section from the first dust accumulation section and which forms a gap between a lower surface of the filter element and the negative-pressure space to communicate with the negative-pressure space, the gap being smaller than the negative-pressure space; and a second dust accumulation section which communicates with the gap and which is disposed under the second dust separation section and which accumulates the dust falling from the filter element separately from the first dust accumulation section, wherein an axial line of the air path forming member is linear, and the air path forming member includes an introductory port, facing the connection port, into which dust-containing air passed through the connection port is introduced, a derivative port, facing the introductory port, via which the separated dust is derived, and an opening which is covered with a filter and disposed between the introductory port and derivative port and via which a part of the air flowing in the air path forming member toward the derivative port from the introductory port is sucked into the intake port to separate the air from the dust going straight in the air path forming member toward the derivative port from the introductory port with inertia, the diameter of the air path forming member gradually decreasing toward the derivative port from the introductory port.

wherein the derivative port and the first dust accumulation section are communicated by a tubular guide section.

6. The vacuum cleaner according to claim 5, further comprising:

a dust drop device which drops the dust sticking to the filter element.

7. The vacuum cleaner according to claim 5, further comprising:

a dust cup which is attachable/detachable with respect to the cleaner main body and which includes the first and second dust separation sections and the first dust accumulation section.

8. The vacuum cleaner according to claim 5, wherein the first dust accumulation section is formed integrally with the second dust accumulation section.

9. The vacuum cleaner according to claims 1 or 5, wherein the second dust separation section includes a filter frame, and the filter element which closes the inside of the frame, and the filter frame includes a dust discharge section which discharges downwards the dust falling from the surface of the filter element.

10. The vacuum cleaner according to claims 2 or 5, wherein the filter element includes a surface treatment layer which smoothes the surface of the element and which maintains gas permeability of the filter element.

11. The vacuum cleaner according to claim 9, wherein the filter element is a pleated filter including front surface grooves and back surface grooves extending in a vertical direction, the dust discharge section includes an element support, and the element support includes dust through sections which communicate with lower ends of the front surface grooves and closing sections which close the lower ends of the back surface grooves, the dust through sections and the closing sections being alternately arranged.

12. The vacuum cleaner according to claim 11, wherein the dust discharge section includes an oblique section disposed under the element support, and the oblique section obliquely projects forwards/downwards opposite to the dust through sections.

13. The vacuum cleaner according to claim 5, wherein the guide section includes an inclined wall section and an air-guiding wall section, wherein the inclined wall section extends oblique downward from the derivative port, and the air-guiding wall section is curved from the inclined wall section to extend downwards.

14. A vacuum cleaner in which a motor blower including an intake port is built in a cleaner main body including a connection port, comprising:

a first dust separation section which is disposed between the connection port and the intake port and which includes a cylindrical air path forming member to separate air and dust flowing toward the intake port through the connection port;

a first dust accumulation section which accumulates the dust separated by the first dust separation section;

a second dust separation section which includes a mat-like filter element raised for use and which is disposed between the first dust separation section and the motor blower and in which the air leading to the intake port from the first dust separation section is mainly passed through an upper part of the filter element;

a partition wall which partitions a negative-pressure space containing the first dust separation section from the first dust accumulation section and which forms a gap between a lower surface of the filter element and the negative-pressure space to communicate with the negative-pressure space, the gap being smaller than the negative-pressure space;

a second dust accumulation section which communicates with the gap and which is disposed under the second dust separation section and which accumulates the dust falling from the filter element separately from the first dust accumulation section; and a dust cup which is attachable/detachable with respect to the cleaner main body and which includes the first and second dust separation sections and the first dust accumulation section, wherein an axial line of the air path forming member is linear, and the air path forming member includes an introductory port, facing the connection port, into which dust-containing air passed through the connection port is introduced, a derivative port, facing the introductory port, via which the separated dust is derived, and an opening which is disposed between the introductory port and derivative port and via which a part of the air flowing toward the derivative port from the introductory port is sucked into the intake port to separate the air from the dust going straight toward the derivative port from the introductory port with inertia, wherein the derivative port and the first dust accumulation section are communicated by a tubular guide section.

15. A vacuum cleaner in which a motor blower including an intake port is built in a cleaner main body including a connection port, comprising:

a first dust separation section which is disposed between the connection port and the intake port and which includes a cylindrical air path forming member to separate air and dust flowing toward the intake port through the connection port;

a first dust accumulation section which accumulates the dust separated by the first dust separation section;

a second dust separation section which includes a mat-like filter element raised for use and which is disposed between the first dust separation section and the motor blower and in which the air leading to the intake port from the first dust separation section is mainly passed through an upper part of the filter element;

a partition wall which partitions a negative-pressure space containing the first dust separation section from the first dust accumulation section and which forms a gap between a lower surface of the filter element and the negative-pressure space to communicate with the negative-pressure space, the gap being smaller than the negative-pressure space; and a second dust accumulation section which communicates with the gap and which is disposed under the second dust separation section and which accumulates the dust falling from the filter element separately from the first dust accumulation section, wherein an axial line of the air path forming member is linear, and the air path forming member includes an introductory port, facing the connection port, into which dust-containing air passed through the connection port is introduced, a derivative port, facing the introductory port, via which the separated dust is derived, and an opening which is and disposed between the introductory port and derivative port and via which a part of the air flowing toward the derivative port from the introductory port is sucked into the intake port to separate the air from the dust going straight toward the derivative port from the introductory port with inertia, wherein the derivative port and the first dust accumulation section are communicated by a tubular guide section, and the first dust accumulation section is formed integrally with the second dust accumulation section.

* * * * *